US012537019B2

(12) United States Patent
Ostrem et al.

(10) Patent No.: US 12,537,019 B2
(45) Date of Patent: Jan. 27, 2026

(54) ACTIVITY CHARTING WHEN USING PERSONAL ARTIFICIAL INTELLIGENCE ASSISTANTS INCLUDING DIFFERENTIATING A PATIENT FROM A DIFFERENT PERSON BASED ON AUDIO ASSOCIATED WITH TOILETTING

(71) Applicant: MatrixCare, Inc., Bloomington, MN (US)

(72) Inventors: Amy Ostrem, Maple Grove, MN (US); Samia Sadeque Alam, Houston, TX (US); Keegan Duane Dsouza, Ocala, FL (US); Kedar Mangesh Kadam, Nova Scotia (CA); Vivek Kumar, Eden Prairie, MN (US); Adhiraj Ganpat Prajapati, St. Paul, MN (US)

(73) Assignee: MATRIXCARE, INC., Bloomington, MN (US)

( * ) Notice: Subject to any disclaimer, the term of this patent is extended or adjusted under 35 U.S.C. 154(b) by 443 days.

(21) Appl. No.: 18/164,336

(22) Filed: Feb. 3, 2023

(65) Prior Publication Data

US 2023/0317098 A1 Oct. 5, 2023

Related U.S. Application Data

(60) Provisional application No. 63/325,075, filed on Mar. 29, 2022.

(51) Int. Cl.
| | |
|---|---|
| *G10L 25/66* | (2013.01) |
| *A47K 17/00* | (2006.01) |
| *G06V 10/56* | (2022.01) |
| *G06V 20/52* | (2022.01) |
| *G10L 17/20* | (2013.01) |
| *G10L 17/22* | (2013.01) |

(Continued)

(52) U.S. Cl.
CPC ............ *G10L 25/66* (2013.01); *G06V 10/56* (2022.01); *G06V 20/52* (2022.01); *G10L 17/20* (2013.01); *G10L 17/22* (2013.01); *G10L 21/0208* (2013.01); *G16H 10/60* (2018.01); *H04N 7/188* (2013.01); *H04N 23/60* (2023.01); *G06V 2201/03* (2022.01)

(58) Field of Classification Search
CPC ......... G10L 25/66; G10L 17/26; A47K 17/00; H04N 7/18; G16H 40/67; G16H 50/70; G16H 50/20; G16H 20/10; G16H 40/63
USPC ......................................................... 704/250
See application file for complete search history.

(56) References Cited

U.S. PATENT DOCUMENTS 8,078,465 B2 * 12/2011 Paul ..................... G10L 25/78
704/250

FOREIGN PATENT DOCUMENTS

| JP | 2000008445 A | * | 1/2000 | ............... E03D 9/08 |
| KR | 20190064889 A | * | 6/2019 | ............. A47K 17/00 |

* cited by examiner

*Primary Examiner* — Farzad Kazeminezhad
(74) *Attorney, Agent, or Firm* — Patterson + Sheridan, LLP

(57) ABSTRACT

The present disclosure provides for the division of environmental sounds from speech sounds to extract and analyze the behaviors and activities occurring in the environment; thus expanding and improving the functionality of AI assistant devices. These environmental sounds can be securely uploaded to an electronic chart, and may be used to aid in the treatment of existing conditions or the prophylaxis/mitigation of conditions not yet experienced by a patient under observation. Accordingly, the present disclosure provides for improved functionality in assistant devices and devices linked to the AI assistant devices.

17 Claims, 12 Drawing Sheets

(51) Int. Cl.
*G10L 17/26* (2013.01)
*G10L 21/0208* (2013.01)
*G16H 10/60* (2018.01)
*G16H 20/10* (2018.01)
*G16H 40/63* (2018.01)
*G16H 40/67* (2018.01)
*G16H 50/20* (2018.01)
*G16H 50/70* (2018.01)
*H04N 7/18* (2006.01)
*H04N 23/60* (2023.01)

ACTIVITY CHARTING WHEN USING PERSONAL ARTIFICIAL INTELLIGENCE ASSISTANTS INCLUDING DIFFERENTIATING A PATIENT FROM A DIFFERENT PERSON BASED ON AUDIO ASSOCIATED WITH TOILETTING

CROSS-REFERENCE TO RELATED APPLICATIONS

This application claims priority to U.S. Provisional Patent Application No. 63/325,075, filed Mar. 29, 2022, the entire content of which is incorporated herein by reference in its entirety.

INTRODUCTION

Embodiments of the present disclosure relate to improving data integrity and reliability. More particularly, the present disclosure provides for the proper collection and securing of data related to tracked activities in a healthcare or home setting.

Various data is collected about a patient in a healthcare environment and recorded to the patient's medical record (e.g., a "health chart") for later review by treating professionals. For example, a patient connected to an electrocardiogram may have heart rate data collected to a chart, and may be visited by a nurse every two hours who manually notes the status of the patient. However, manually collected data may be subject to errors in human recollection or intentional falsehoods that render such data unreliable. For example, the nurse who charts the patient's status every two hours may ask the patient whether the toilet was used in the past two hours to confirm bowel or kidney function and the patient may lie (out of embarrassment or to attempt to receive early discharge from the healthcare facility). These challenges with manual charting accuracy and reliability are further exacerbated in group home or personal home settings, where manual entry may be fully reliant on a patient self-reporting, and longer gaps between reporting periods may further affect the ability for the patient to accurately recall various activities that a healthcare professional wants to track.

SUMMARY

Certain embodiments provide a method that includes capturing, via an Artificial Intelligence (AI) assistant device, audio from an environment; determining, via a machine learning model provided by the AI assistant device and based on the audio, that a patient has performed an event in the environment related to the health of the patient; establishing a secure connection with a charting repository located remotely from the AI assistant device; and adding the event to a health chart associated with a patient maintained by the charting repository.

Certain embodiments provide a method that includes identifying a patient and a behavior related to a health condition for the patient that is tracked in an electronic health chart; capturing, via an AI assistant device, audio from an environment; capturing, via a sensor separate from the AI assistant device, a reading from the environment; determining, via a machine learning model provided by the AI assistant device and based on the audio and the reading, that an event associated with the behavior has occurred in the environment; establishing a secure connection with a charting repository located remotely from the AI assistant device; and adding the event to the electronic health chart associated with the patient maintained by the charting repository.

Certain embodiments provide a method that includes capturing, via an AI assistant device, audio from an environment; dividing, via a machine learning model provided by the AI assistant device, the audio into environmental sounds and speech sounds; analyzing the environmental sounds by the machine learning model to determine whether a person has performed a behavior associated with a health condition tracked in a health chart for a patient; analyzing the speech sounds by the machine learning model to determine whether the patient or a different person performed the behavior; and in response to determining that the patient performed the behavior: establishing a secure connection with a charting repository located remotely from the AI assistant device and indicating in the health chart associated with the patient maintained by the charting repository that the patient performed the behavior.

Certain embodiments provide an AI assistant device that includes a microphone configured to capture audio from an environment; a machine learning model configured to determine, based on the audio, that a patient has performed an event in the environment related to the health of the patient; a network interface configured to: establish a secure connection with a charting repository located remotely from the AI assistant device; and add the event to a health chart associated with a patient maintained by the charting repository.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for automating charting or health information when using personal artificial intelligence (AI) assistants.

AI assistants provide a bevy of services to their users. These services can include responding to voice-activated requests (e.g., responding via audio to a request for the day's forecast with a local weather prediction), integrating with a calendar, controlling appliances or lights, placing phone calls, or the like. These AI assistants often reside partially on a local device, as a local client, and partially in a back-end service located remotely (e.g., in a cloud server) from the local device. The local client handles data collection, some preprocessing, and data output, while the back-end service may handle speech recognition, natural language processing, and data fetching (e.g., looking up the requested weather forecast).

Some AI assistants may discard or otherwise filter out environmental sounds as undesirable noise when listening for speech sounds. The present disclosure provides for the division of environmental sounds (supplemented by one or more additional sensors) from speech sounds to extract and analyze the behaviors and activities occurring in the environment, thereby expanding and improving the functionality of the assistant devices. These environmental sounds provide for a record of activities in the environment that is not subject to misremembering or false reporting and provide for a more convenient and less intrusive automated collection system than prior monitoring devices. Accordingly, the data collected provides a more complete picture of the activities occurring in the environment, while still respecting the privacy of the monitored patient. This data is securely uploaded to an electronic chart and may be used to aid in the treatment of existing conditions or the prophylaxis/mitigation of conditions not yet experienced by a patient under observation. Accordingly, the present disclosure provides for improved functionality in assistant devices and devices linked to the assistant devices, improved processing speed, improved data security, and improved outcomes in healthcare (including prophylactic care and improved accuracy in diagnoses and treatments).

Example Use Environment

Figure 1:
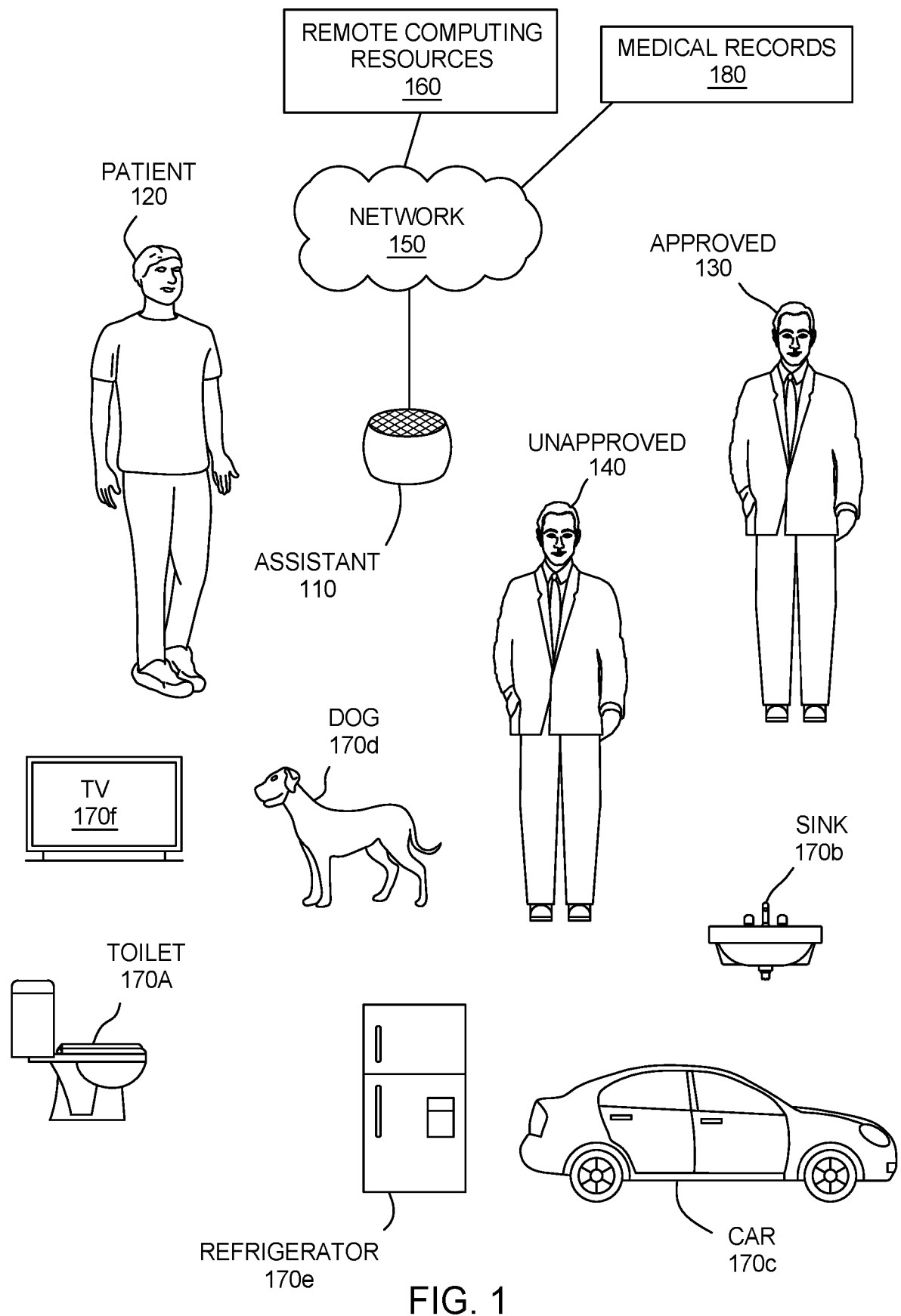
FIG. 1 illustrates an environment in which an assistant device, hosting a local client for an AI assistant, may be deployed to interact with various persons, according to embodiments of the present disclosure.

FIG. 1 illustrates an environment 100 in which an assistant device 110, hosting a local client for an AI assistant, may be deployed to interact with various persons, according to embodiments of the present disclosure. As discussed herein, the environment 100 is a residential environment, such as a personal home, a group home, a care facility, a community center, a car, a store, or other community area. Various persons may come and go in the environment 100 with different levels of access to health information. The environment 100 generally refers to the surrounding areas in which audio outputs of the assistant device 110 are comprehensible to a person of average hearing (unaided by listening devices), and the boundary of the environment 100 may be defined by a Signal to Noise Ratio (SNR) in decibels (dB) for output audio that may change as the volume of the assistant device 110 changes or as background noise changes.

In a healthcare context, the persons that an assistant device 110 may variously interact with include patients 120 whose health and well-being are monitored, authorized persons 130 who are currently authorized by the patients 120 to receive health information related to the patient 120 via the assistant device 110, and unauthorized persons 140 who are not currently authorized by the patients 120 receive health information related to the patient 120. In various embodiments, the authorized persons 130 and the unauthorized persons 140 may be permitted to interact with the assistant device 110 (or denied access to the assistant device 110) for non-healthcare related information independently of the permissions granted/denied for receiving health information related to the patient 120. Various other objects 170a-f (generally or collectively, objects 170) may also be present in the environment 100 or otherwise be observable by the assistant device 110 including, but not limited to: toilets 170a, sinks 170b, cars 170c, pets 170d, appliances 170e, audio sources 170f (e.g., televisions or radios), etc.

As used herein, a patient 120 may be one of several persons in the environment 100 to whom medical data and personally identifiable information (PII) pertain. Generally, a patient 120 is an authorized user for accessing their own data, and may grant rights for others to also access those data or to grant additional persons the ability to access these data on behalf of the patient 120 (e.g., via medial power of attorney). For example, a patient 120 may grant an in-home health assistant, a nurse, a doctor, a trusted relative, or other person the ability to access medical data and PII. A patient 120 may also revoke access to the medical data and PII and may grant or revoke access to some or all of the data. Accordingly, a patient 120 is a person that the medical data and PII relate to, authorized persons 130 are those with currently held rights to access some or all of the medical data and PII, and unauthorized persons 140 include those who have not yet been identified as well as those currently lacking rights to access the medical data and PII. The identification and classification of the various persons is discussed in greater detail in relation to FIG. 2.

The assistant device 110 offers a user interface for requesting and receiving controlled access to health information. In some embodiments, the assistant device 110 is an audio-controlled computing device with which the users may interact with verbally, but various other devices may also be used as a user interface to request or provide health information to authorized parties in the environment. For example, a television may be used to output health information via a video overlay, a mobile telephone may be used to receive requests via touch-input and output health information via video or audio, etc. Generally, the assistant device 110 can be any device capable of hosting a local instance of an AI assistant and that remains in an "on" or "standby" mode to receive requests and provide outputs related to health information while remaining available for other tasks. For example, the assistant device 110 may also handle home automation tasks (e.g., controlling a thermostat, lights, appliances) on behalf of a user or interface with the television to provide health information while the patient 120 is watching a program. Example hardware for an assistant device 110 is discussed in greater detail in regard to FIG. 6.

In various embodiments, the assistant device 110 captures audio in the environment 100 and, to determine how to respond to the captured audio, may locally process the audio, may be in communication with remote computing resources 160 via a network 150 to process the audio remotely, or may perform some audio processing and some audio processing remotely. The assistant device 110 may connect to the network 150 via wired technologies (e.g., wires, fiber optic cable, etc.), wireless technologies (e.g., WIFI, cellular, satellite, Bluetooth, etc.), or combinations thereof. The network 150 may incorporate any type of communication network, including data and/or voice networks, local area networks, and the Internet.

To determine how or whether to respond to audio captured in the environment, the assistant device 110 may need to filter out unwanted noises from desired audio, the source of the audio, and the content of the audio. For example, if the assistant device 110 detects audio of a request for the next scheduled doctor's appointment for the patient 120, the assistant device 110 may need to determine whether the request was received from an audio source 170f as unwanted noise (e.g., a character speaking in a movie or television program), the patient 120, an authorized person 130 (e.g., an in-home care assistant looking up care details for the patient 120), or an unauthorized person 140 (e.g., a curious visitor without authorization to receive that information from the assistant device 110). Other filters may be used to identify and discard sounds made by various other objects 170 in the environment 100.

In order to identify the content of the desired audio (e.g., a command to the assistant device 110), an audio recognition (AR) engine (described in FIG. 7) performs audio analysis/filtering and speech recognition on the captured audio signals and calculates a similarity between any audio identified therein and known audio samples (e.g., utterances for certain desired interactions). The AR engine then compares this similarity to a threshold and, if the similarity is greater than the threshold, the AR engine determines that a known audio cue has been received from the environment. The AR engine may use various types of speech and audio recognition techniques, such as, large-vocabulary speech recognition techniques, keyword spotting techniques, machine-learning techniques (e.g., support vector machines (SVMs)), neural network techniques, or the like. In response to identifying an audio cue, the assistant device 110 may then use the audio cue to determine how to next respond. Some or all of the audio processing may be done locally on the assistant device 110, but the assistant device 110 may also offload more computationally difficult tasks to the remote computing resources 160 for additional processing.

In various embodiments, the assistant device 110 may also access health records 180 via the network 150 or may store some health records 180 locally for later access. The health records may include one or more of: medical histories for patients, upcoming or previous appointments, medications, personal identification information (PII), demographic data, emergency contacts, treating professionals (e.g., physicians, nurses, dentists), medical powers of attorney, and the like. The health records 180 may be held by one or more different facilities (e.g., a first doctor's office, a second doctor's office, a hospital, a pharmacy) that the assistant device 110 authenticates with to receive the data. The assistant device 110 may locally cache some of these health records 180 for offline access or faster future retrieval. Additionally or alternatively, a patient 120 or authorized person 130 can locally supply the medical data, such as by requesting the assistant device 110 to "remind me to take my medicine every morning", importing a calendar entry for a doctor's appointment from a linked account or computer, or the like.

Additionally, the assistant device 110 may store identifying information to distinguish the patient 120, approved persons 130, and unauthorized persons 140 when deciding whether to share the health records 180 or data based on the health records 180.

Figure 2:
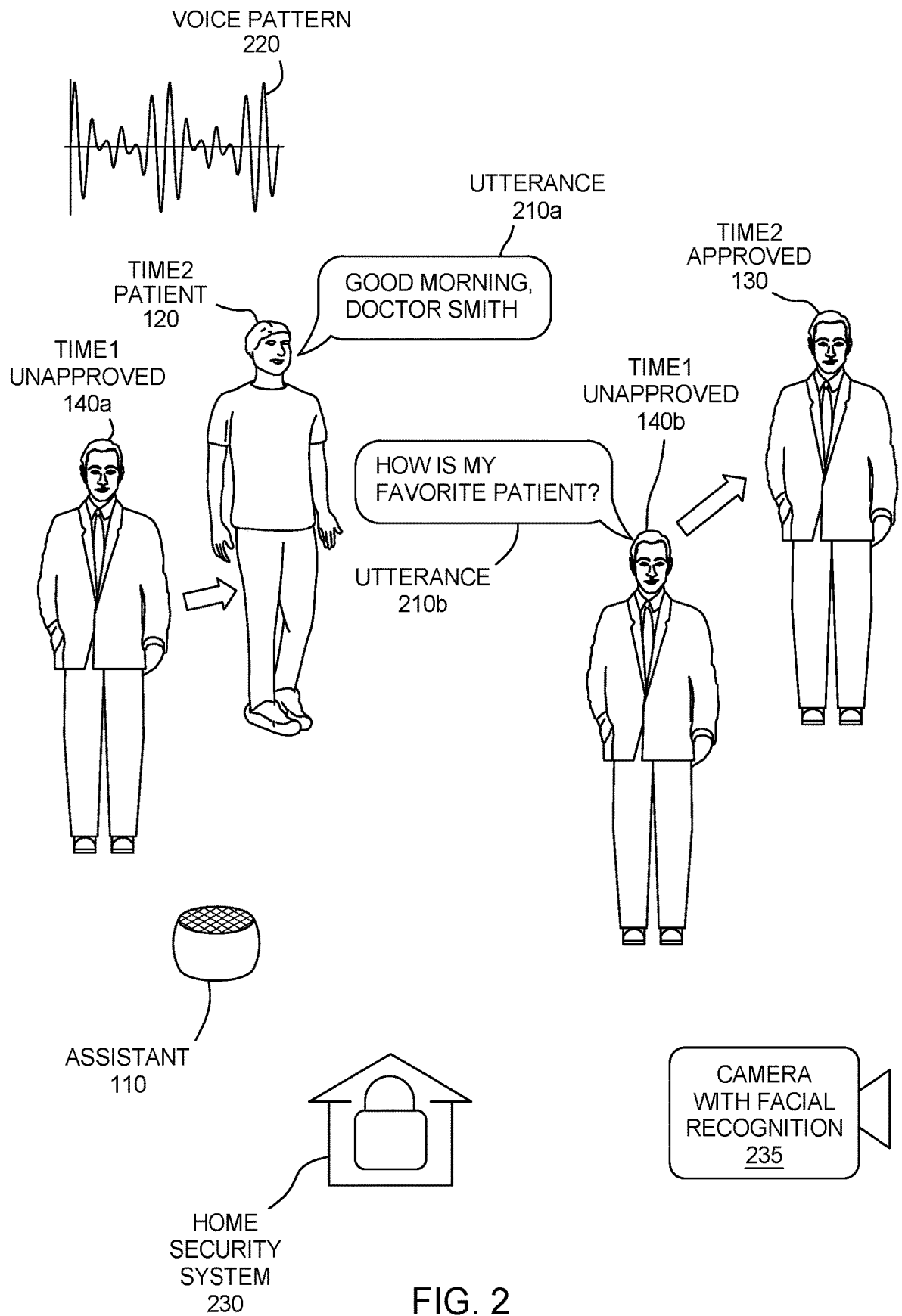
FIG. 2 illustrates an environment in which an assistant device may be deployed when identifying various parties and determining how to respond, according to embodiments of the present disclosure.

FIG. 2 illustrates an environment 200 in which an assistant device 110 may be deployed when identifying various parties and determining how to respond, according to embodiments of the present disclosure. The assistant device 110 can identify or infer the presence of a person in the environment 200 based on received audio containing speech, the sound of a door into the environment opening, or additional presence data received from sensors. The various sensors may include or be part of a computing system 700 as is described in greater detail in regard to FIG. 7.

Generally, until a person has been identified, the assistant device 110 classifies that person as an unauthorized person 140 and may ignore commands or audio from that person. For example, at time1, the assistant device 110 may know that two persons are present in the environment 200, but may not know the identities of those persons, and therefore treats the first person as a first unauthorized person 140a and the second person as a second unauthorized person 140b.

In various embodiments, persons can identify themselves directly to the assistant device 110 or may identify other parties to the assistant device 110. For example, when a first utterance 210a (generally or collectively, utterance 210) is received from the first unauthorized person 140a, the assistant device 110 may extract a first voice pattern 220a (generally or collectively, voice pattern 220) from the words (including pitch, cadence, tone, and the like) to compare against other known voice patterns 220 to identify an associated known person. In the illustrated example, the first voice pattern 220a matches that of a patient 120, and the assistant device 110 therefore reclassifies the first unauthorized person 140a to be the patient 120.

The assistant device 110 may store various identity profiles for persons to identify those persons as a patient 120, approved persons 130 for that patient, or as unauthorized persons 140 for that patient, which various levels of rights to access or provide health information for the patient 120.

Once a person has been identified as a patient 120 (or other approved party trusted to identify other persons with whom access should be granted), the assistant device 110 may rely on utterances 210 from that trusted person to identify other persons. For example, the first utterance 210a can be used to identify the first unauthorized person 140a as the patient 120 based on the associated first voice pattern 220a, and the contents of the first utterance 210a can be examined for information identifying the other party. In the illustrated example, the assistant device 110 (either locally or via remote computing resources 160) may extract the identity 'Dr. Smith" from the first utterance 210a to identify that the second unauthorized person 140b is Dr. Smith, who is an approved person 130 for the patient 120, and the assistant device 110 therefore reclassifies the second unauthorized person 140b to be an approved person 130 for the patient 120.

Additionally or alternatively, the assistant device 110 may identify Dr. Smith as an approved person 130 based on a second voice pattern 220b extracted from the second utterance 210b spoken by Dr. Smith. The voice patterns 220 may be continuously used by the assistance device 110 to re-identify Dr. Smith or the patient 120 (e.g., at a later time) within the environment 200 or to distinguish utterances 210 as coming from a specific person within the environment 200.

When multiple persons are present in the environment 200, and potentially moving about the environment, the assistant device 110 may continually reassess which person is which. If a confidence score for a given person falls below a threshold, the assistant device 110 may reclassify one or more persons as unauthorized persons 140 until identities can be reestablished. In various embodiments, the assistant device 110 may use directional microphones to establish where a given person is located in the environment 200, and may rely on the various sensors, such as a home security system 230 or a camera 235 with facial recognition to identify how many persons are located in the environment 200 and where those persons are located.

Example Bathroom Environmental Monitoring Scenarios

FIGS. 3A-3D illustrate exemplary bathroom monitoring scenarios when an assistant device 110 discretely monitors and reports on behaviors occurring in a bathroom environment 300, according to embodiments of the present disclosure. Although several of the example scenarios are discussed in relation to the patient 120, the assistant device 110 may also similarly interact with one or more authorized persons 130 in addition to or instead of the patient 120 in each such scenario.

As illustrated in each of FIGS. 3A-3D, the bathroom environment 300 includes a toilet 170a, a sink 170b, and a bathtub or shower 340. In various embodiments, each of the toilet 170a, sink 170b, and bathtub/shower 340 may be associated with different environmental sounds 310a-c (generally or collectively, environmental sound 310), which may indicate the presence of a person in the bathroom environment 300 and various events occurring in the bathroom environment 300. In some embodiments, the bathtub or shower 340 maybe omitted (e.g., in a half-bath).

Figure 3A:
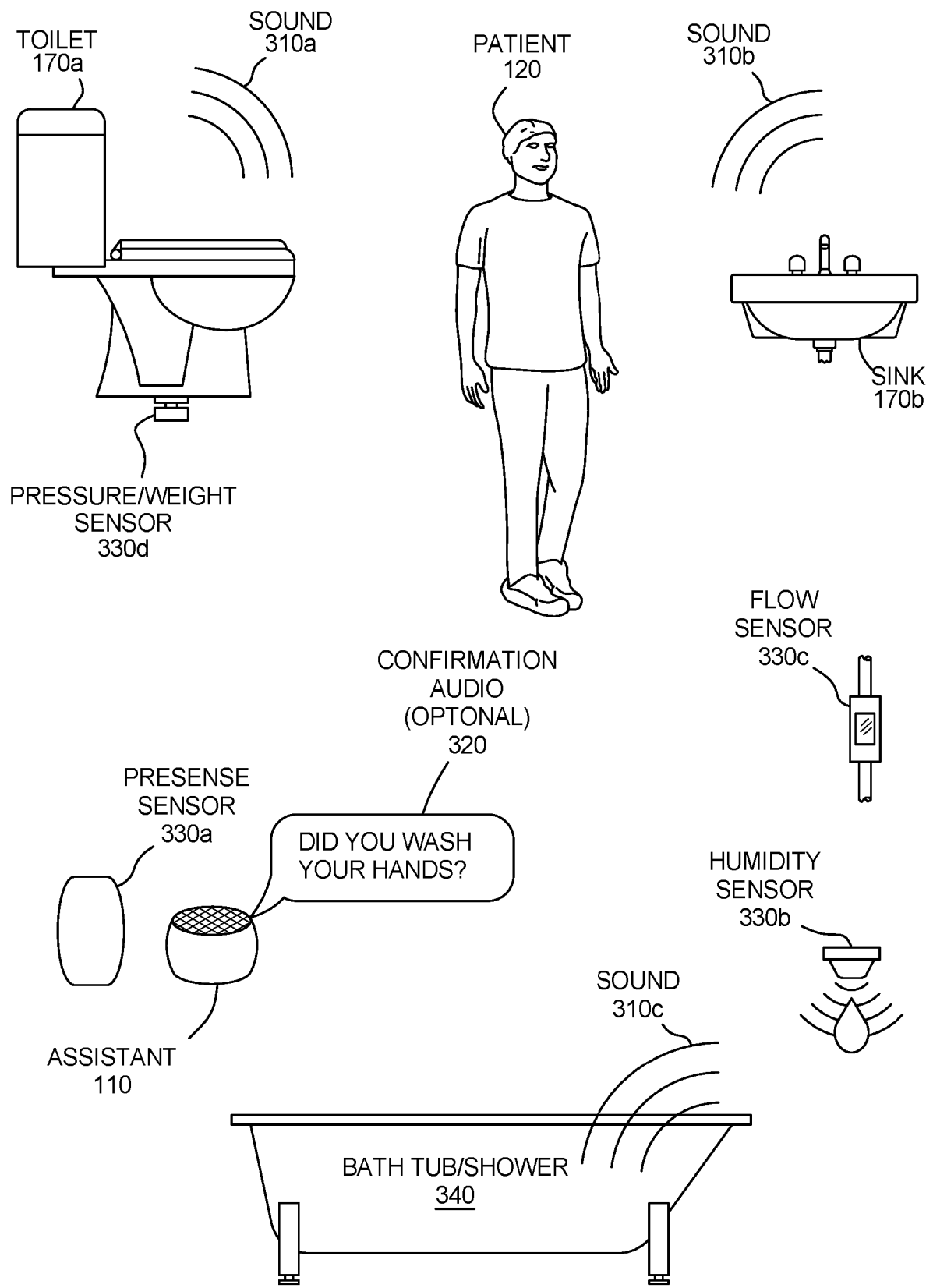
FIGS. 3A-3D illustrate example bathroom tracking scenarios, according to embodiments of the present disclosure.

FIG. 3A illustrates a first scenario in which a patient 120 interacts with one or more of a toilet 170a and a sink 170b in a bathroom environment 300, according to embodiments of the present disclosure.

When the environmental sounds 310 are insufficient to identify the patient 120 or confirm the behaviors taken by the patient 120 in the bathroom environment 300, the assistant device 110 may generate confirmation audio 320 to request confirmation or additional details from the person present in the bathroom environment 300. As illustrated in FIG. 3A, the assistant device 110 asks the patient 120, via synthesized human speech in an audio output "did you wash your hands?". The contents of the confirmation audio 320 may be direct (e.g., to confirm whether the patient 120 washed their hands when the assistant device 110 is unsure whether hand washing or tooth brushing having occurred) or indirect (e.g., to receive an utterance from the person in the bathroom environment 300 when the identity of that person is unknown, but using the sink 170b is known).

In various embodiments, the assistant device 110 may use a series of environmental sounds 310 to identify a toileting event, which may include two or more of: waste entering the toilet 170a, flushing of the toilet 170a, toilet paper being accessed or torn, running water in a sink 170b, soap dispensing, hand dryers or automated towel dispensers activating, etc. Because patients 120 may skip one or more of these activities associated with toileting behavior (e.g., forgetting to flush, not using toilet paper for certain toileting activities, not washing hands) or perform some activities out of sequence from the example order (e.g., flushing after hand washing), the assistant device 110 may set various sequences to analyze whether toileting activity occurred based on potential sequences of environmental sounds 310.

In addition to the various environmental sounds 310 and potential speech sounds from the patient 120 that the assistant device 110 can monitor for, the assistant device 110 may be in communication with one or more additional sensors 330a-d (generally or collectively, sensors 330) that may include a presence sensor 330a to indicate proximity to various features in an environment (e.g., whether a person is within X inches of a toilet or faucet) without capturing images of the person while toileting. Such presence sensors 330a provide for privacy for the user and may be integrated into the faucets and flushing mechanisms as part of "automatic" sinks 170b and toilets 170a. In another example, a pressure or weight sensor 330d may be integrated in the seat of a toilet 170a or in various floor mats near the various appliances and fixtures in the bathroom environment 300 to indicate when the patient is present in a given region of the bathroom environment 300 and what person (e.g., based on weight) is present. Additionally, various flow sensors 330c and humidity sensors 330b can be disposed in the bathroom environment 300 to identify when (and potentially how long) a given feature has been in use based on water flow through a specific fixture, or the effect of running water on the environment.

Figure 3B:
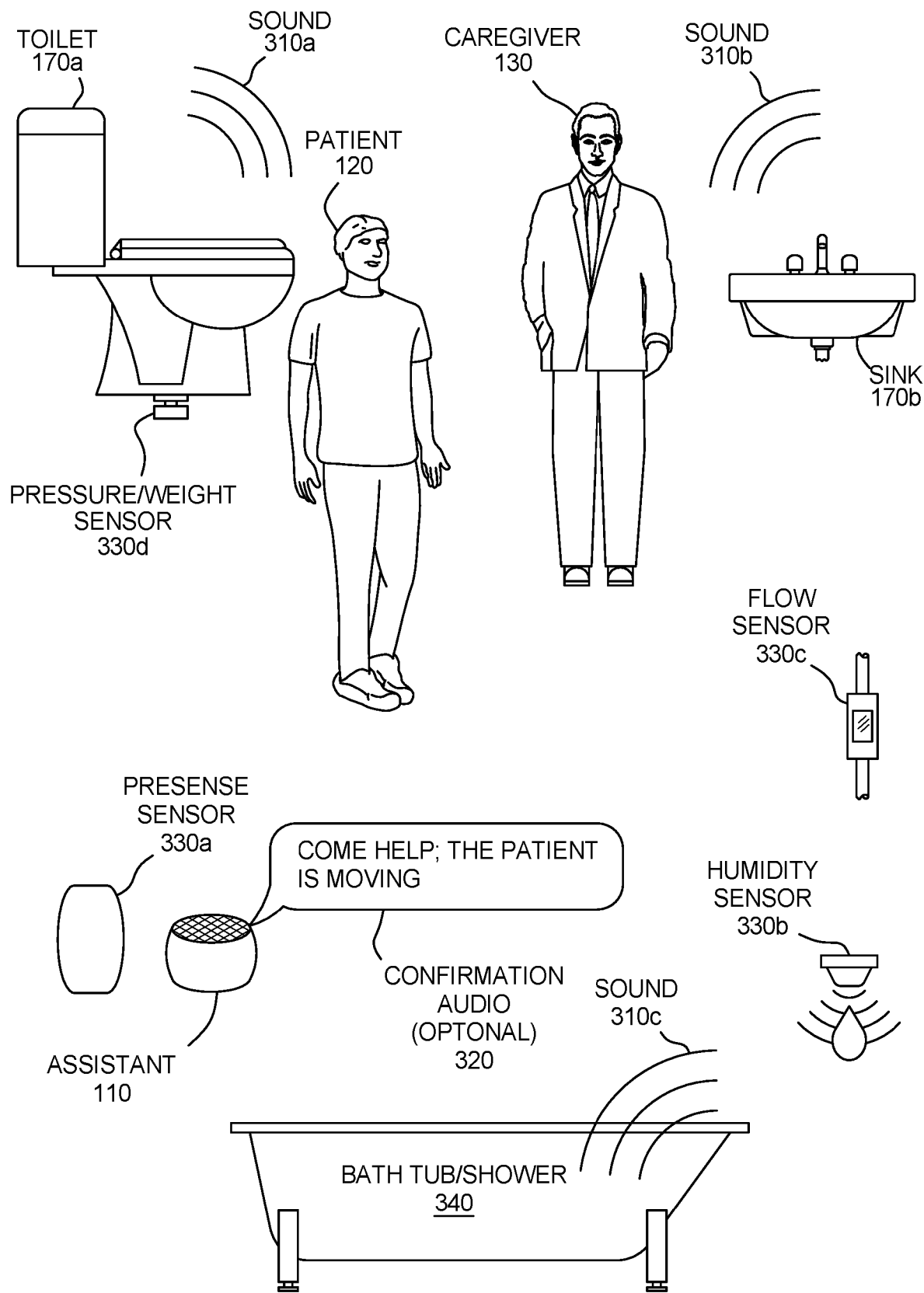

FIG. 3B illustrates a second scenario in which the assistant device 110 provides a caretaker (as an example of an authorized person 130) with analysis of the behavior in the bathroom environment 300, according to embodiments of the present disclosure.

For example, after detecting that a patient 120 has entered the bathroom environment 300 and initiated toileting behaviors, the assistant device 110 may issue a confirmation audio 320 (in one or both of the bathroom environment 300 and outside of the bathroom environment 300) of "come help; the patient is moving" to alert caretakers of the toileting behavior. Accordingly, the caretaker, who may assist with post-toileting clean up or in helping the patient 120 stand and walk out of the bathroom environment 300 when complete, is alerted in a timely fashion without requiring (or relying on) the patient 120 to report the toileting.

In various embodiments, the assistant device 110 may differentiate the patient 120 from the other person and thereby track the toileting event and subsequent events (such as hand washing) for the patient 120 (and not the other person) based on the timing of when the various persons are identified or the known identities of the different persons. For example, when the patient 120 is identified as sitting on the toilet 170a, all subsequent actions related to toileting behavior (e.g., toileting sounds, hand washing, etc.) are associated with the patient 120, even if the other person arrives in the bathroom environment 300 while the subsequent actions are taking place. In another embodiment, when the other person is identified as a caretaker (e.g., based on voice pattern, facial recognition, etc.), no toileting activities are associated with the caretaker, as the assistant device 110 may assume based on the caretaker role that the caretaker is not toileting in the patient's bathroom or any toileting done by the caretaker is not of interest for charting.

Additionally, in some embodiments, such as when the patient 120 has been designated as a fall risk who should not attempt toileting behaviors unassisted, the assistant device 110 may chart when the patient 120 attempts to toilet alone to indicate that the patient 120 is at greater risk due to personal behaviors. For example, when the assistant device 110 detects that the patient 120 is initially alone in the bathroom environment 300 and has been marked by a healthcare professional to not attempt toileting alone, the fact that the patient 120 did attempt to toilet alone (even if a caretaker was called in time) may be added to an electronic health record for the patient 120. Accordingly, caretakers may be alerted immediately in an effort to intervene and assist the patient while also providing an alert note/date/time that the patient 120 has been noncompliant with directives to ask for aid before undertaking various activities, and may require further observation to avoid the patient 120 having an accident.

Figure 3C:

FIG. 3C illustrates a third scenario in which the assistant device 110 interacts with a patient 120 via an alternative channel from audio output to receive additional input, while maintaining the privacy of the patient 120, according to embodiments of the present disclosure.

In various embodiments, the assistant device 110 may interface with one or more personal devices 350 (e.g., cell phones, smart watches, tablets, etc.) associated with the patient 120 or an authorized party for use as an alternative channel to privately provide the health information or privately request authorization to share data with an unauthorized person 140. In various embodiments, the assistant device 110 may perform an authorization handshake with a prospective personal device 350 for use as an alternative channel to ensure that the personal device 350 is under the control of an authorized person 130 and will not act as a public conduit of health information (e.g., ensuring a text to speech application does not read aloud any communication sent to the personal device 350 from the assistant device 110). In various embodiments, the authorization handshake may request a shared secret phrase from the authorized person (e.g., a password) or use facial recognition to ensure that the personal device 350 is under the control of an authorized person 130 before using the personal device 350 as an alternative channel.

Figure 3D:
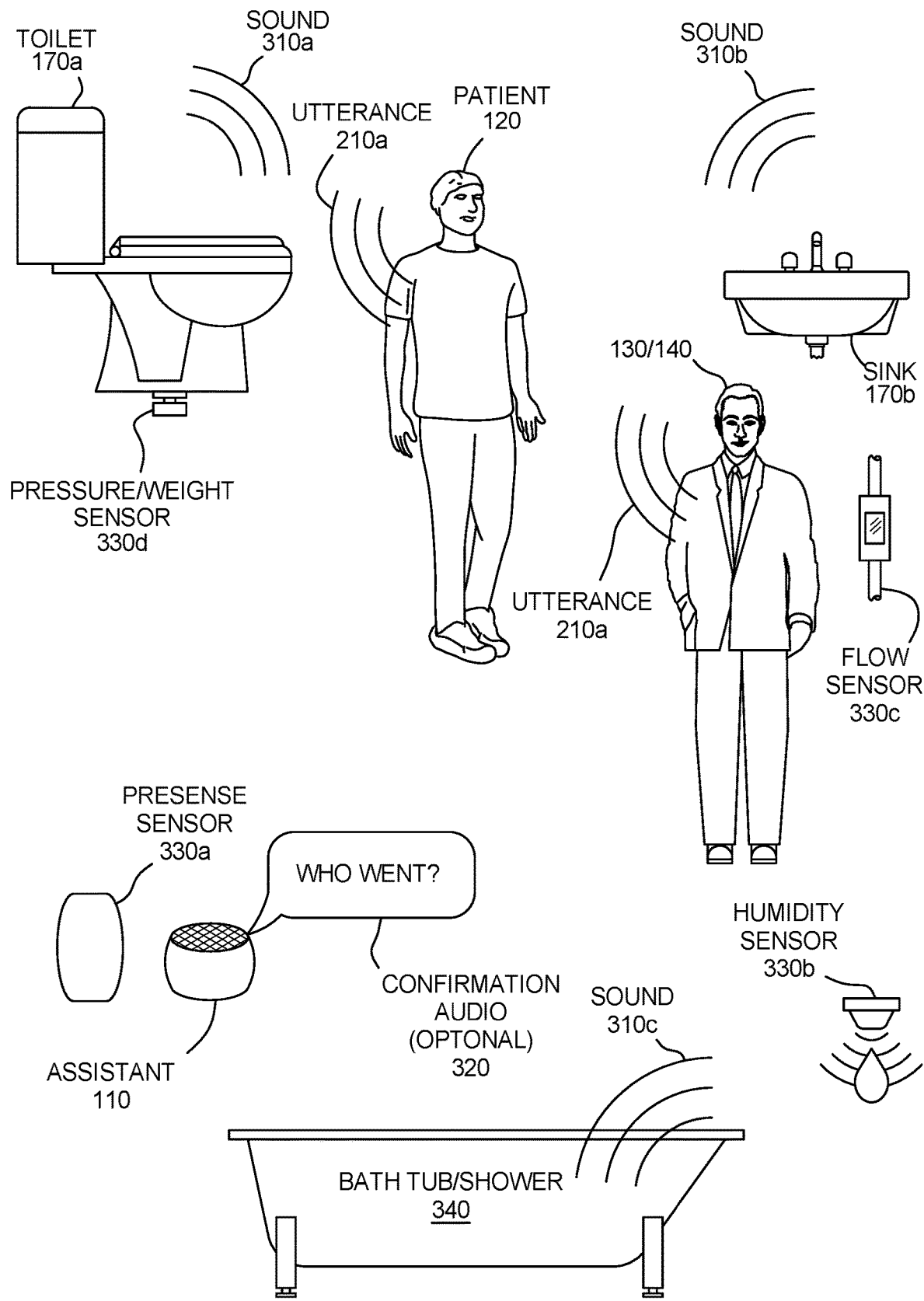

FIG. 3D illustrates a fourth scenario in which the assistant device 110 interacts with a patient 120 and another person in the bathroom environment 300 to determine which person to attribute toileting activities to, according to embodiments of the present disclosure. As illustrated, the assistant device 110 identifies a patient 120 and another person (who may be an authorized person 130, an unauthorized person 140, or a different patient 120 associated with a different chart) in a bathroom environment 300 and receives environmental sounds 310 related to toileting. For example, the other person may be helping the patient 120 in toileting, or the patient 120 may be entering the bathroom environment 300 after the other person has toileted. Accordingly, the assistant device 110 may be unsure (e.g., according to a confidence threshold) as to which person toileted, and therefore may need further clarification before adding the toileting event to the patient's chart.

When the assistant device 110 is unsure of who performed a tracked behavior, the assistant device 110 may request additional data from other sensors 330 in the bathroom environment 300. Additionally or alternatively, the assistant device 110 may generate a confirmation audio 320 to prompt one or more of the persons in the bathroom environment 300 to further identify which person performed the tracked behavior. For example, the assistant device 110 may ask "who went to the bathroom?" in the confirmation audio 320 to receive a reply from at least one person as to who was responsible for the toileting event.

Although the confirmation audio 320 is discussed in relation to increasing confidence in which person to assign the behavior to, the assistant device 110 may generate confirmation audio 320 to resolve various behavioral aspects that fall below a corresponding confidence threshold. For example, in relation to toileting, the confirmation audio 320 may request information about whether the behavior actually occurred (e.g., to distinguish toileting from cleaning), elements of the behavior (e.g., defecation versus urination, quantities/volumes of waste), qualities of the behavior (e.g., classifying a bowel movement on the Bristol Stool Chart), etc., that may not be trackable by audio alone.

In addition to identifying what has happened, the assistant device 110 can determine patterns and events that have not happened. This is an additional alert that can be tracked including, but not limited to, duration of time in the bathroom for each activity, frequency of trips to the toilet per day, reasons for each trip to the toilet to monitor regularity, or lack of trips to the toiler. Things identified as out of range or outside of normal can be immediately shared on a regular basis to caregivers via the assistant 110 and the network 150.

Example Living Quarters Monitoring Scenarios

Figure 4A:
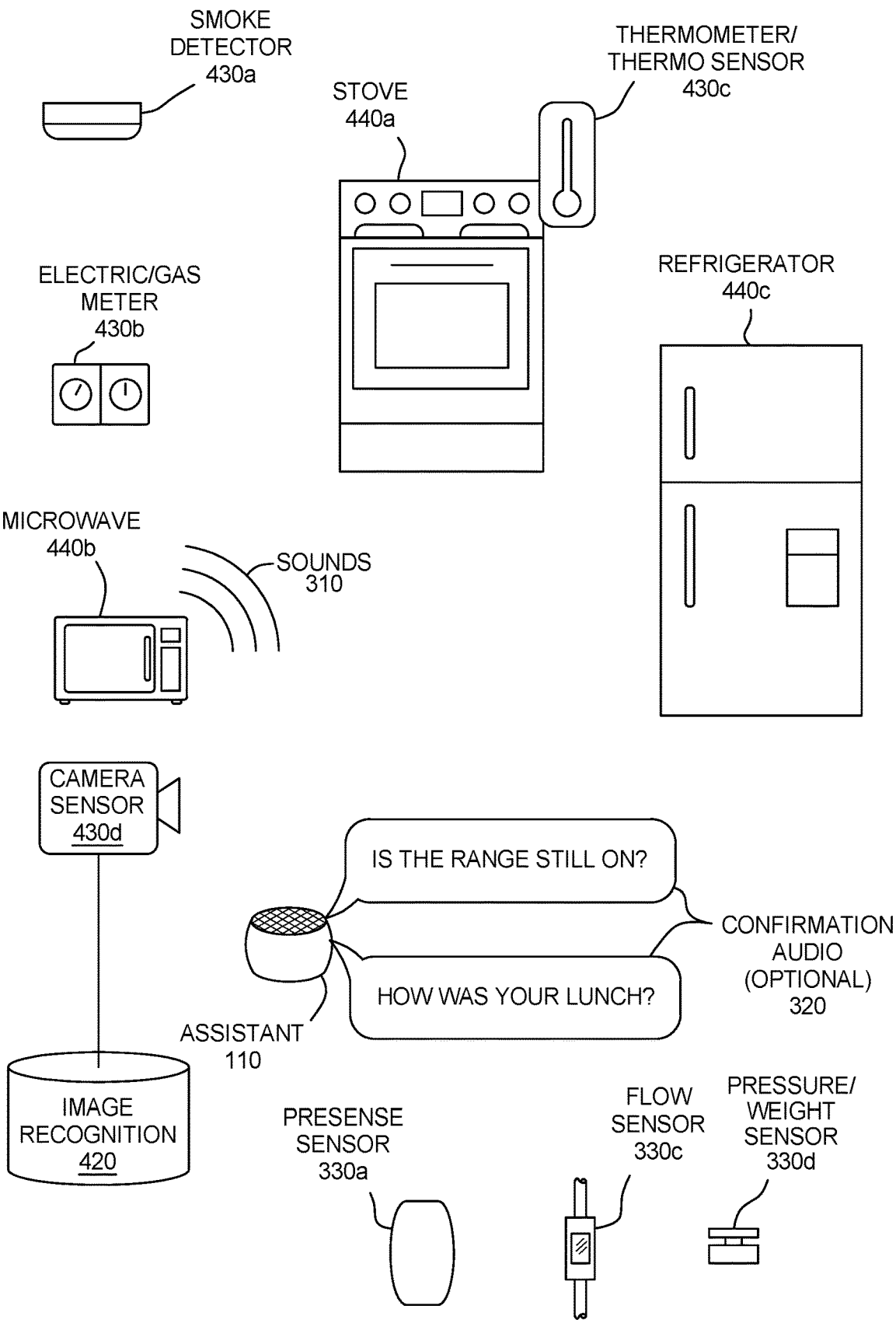
FIGS. 4A-4C illustrate example living quarters tracking scenarios, according to embodiments of the present disclosure.
Figure 4B:
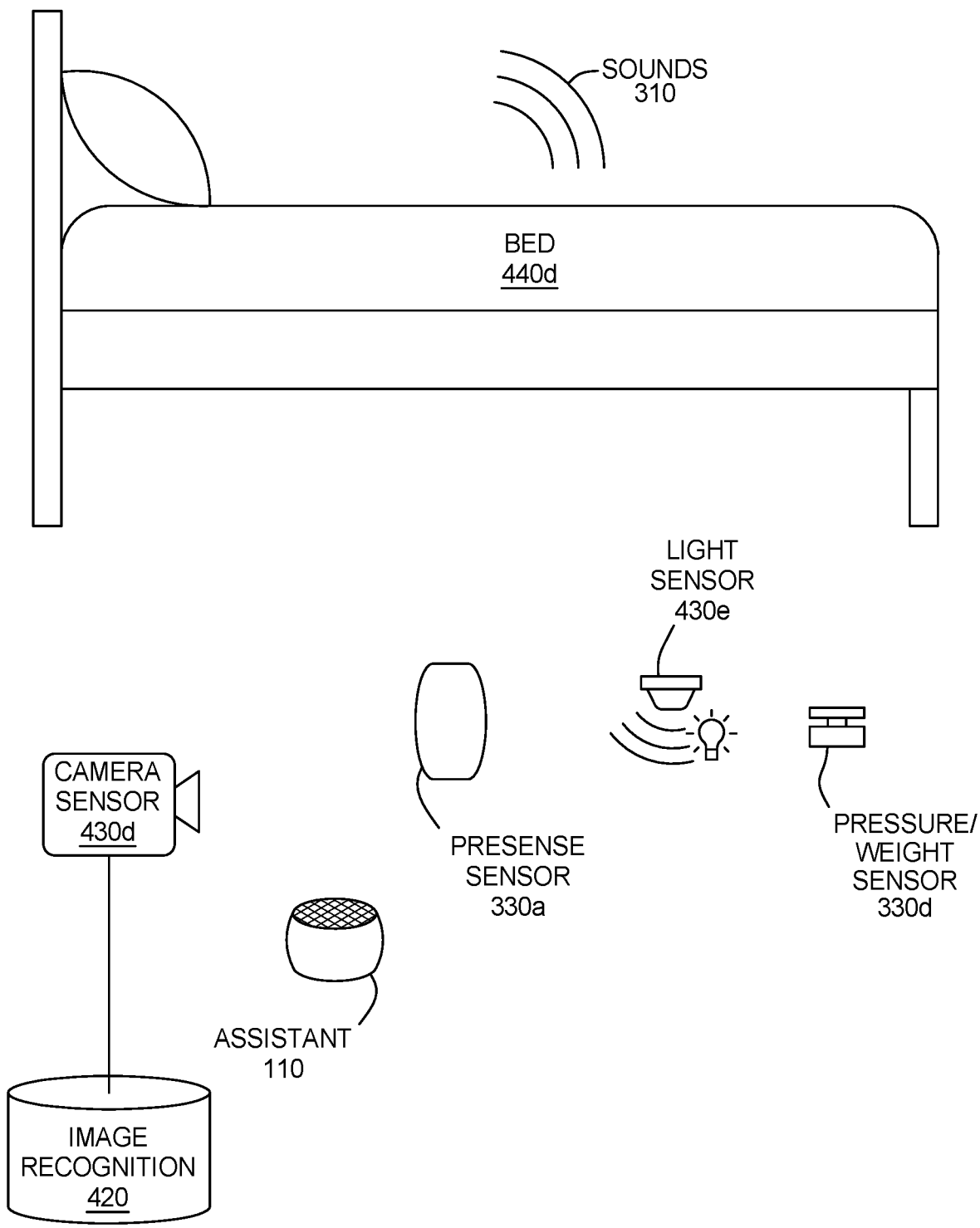
Figure 4C:
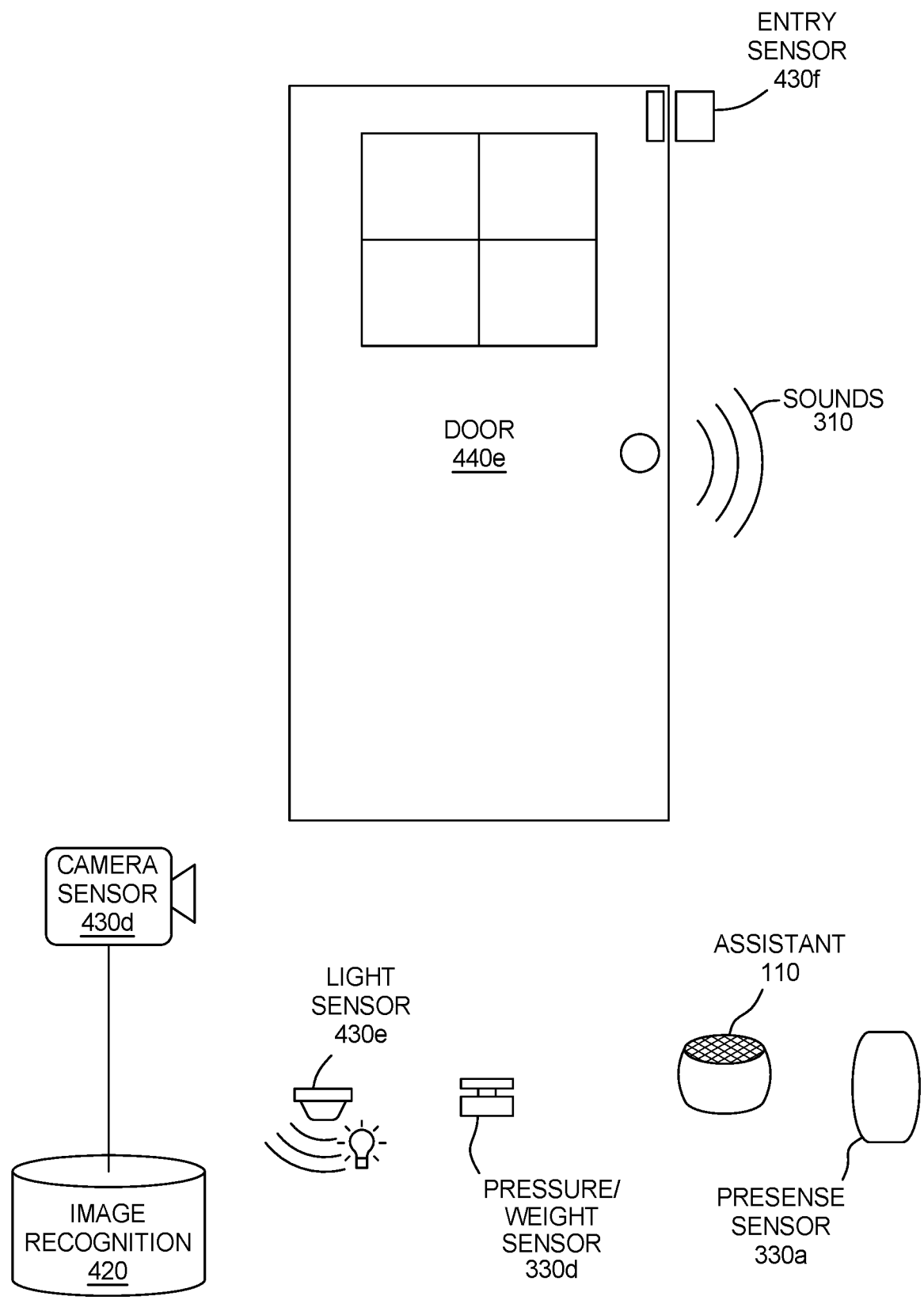

FIGS. 4A-4C illustrate example living quarters tracking scenarios when an assistant device 110 discretely monitors and reports on behaviors occurring in certain areas in a residential environment 400, according to embodiments of the present disclosure. Although several of the example scenarios are discussed in relation to the patient 120, the assistant device 110 may also similarly interact with one or more authorized persons 130 or unauthorized persons 140 in addition to or instead of the patient 120 in each such scenario, according to embodiments of the present disclosure. Each of FIGS. 4A-4C include several fixtures 440a-e (generally or collectively, fixture 440) that are associated by the assistant device 110 with various activities and behaviors that are tracked for a patient 120. Additionally, the assistant device 110 may be in communication with various residential sensors 430a-f (generally or collectively, residential sensor 430) to collect additional or supplemental information about the activities occurring in the residential environment 400. Unlike supplemental sensors 330 that may be used in a bathroom environment 300 (e.g., as per FIGS. 3A-3D), the residential sensors 430 may include a greater number of types of sensors, some of which may be inappropriate or sub-optimal for use in a bathroom environment 300 for various reasons (e.g., privacy issues, greater humidity affecting operation, more variable environmental heat, etc.).

FIG. 4A illustrates a first scenario, in which the monitored portion of the residential environment 400 includes a kitchen or other area used for food preparation, storage, consumption, and combinations thereof, according to embodiments of the present disclosure. As illustrated, a kitchen portion of the residential environment 400 may include several fixtures 440a-c related to tracked behaviors (and emergency conditions) such as, for example, eating behaviors, cooking behaviors, drinking behaviors, consumption behaviors (including eating and drinking), and the like. For example, the fixtures 440 may include a stove 440a (including a range and an oven), a microwave 440b, and a refrigerator 440c, and the assistant device 110 may monitor the use of the various fixtures 440 by associated environmental sounds 310, supplemental sensors 330, and/or residential sensors 430a-d that are present in the residential environment 400 or integrated with a fixture 440.

The assistant device 110 may monitor the kitchen portion of the residential environment 400 for various environmental sounds 310 associated with tracked behaviors (e.g., pots or pans clanging when placed on a stove 440a, a microwave 440b humming, a door of a refrigerator 440c opening and closing, etc., to indicate food is being prepared), and may supplement the environmental sounds 310 with data from the various supplemental sensors 330 and residential sensors 430 to resolve ambiguities raised by the initial determinations based on environmental sounds 310.

For example, the residential sensors 430 may include camera sensors 430d, that are linked with an image recognition system 420 to identify various objects in the residential environment 400. Accordingly, a camera sensor 430d may supply images taken in the residential environment 400 that are analyzed for specific features by an image recognition system 420 for further behavior tracking. For example, the assistant device 110 may determine that the patient 120 has engaged in eating behavior via audio cues in the residential environment 400 (e.g. environmental sounds 310 of noisy chewing) but may not know what food the patient 120 is eating. Accordingly, the camera sensor 430d may be invoked to take an image of the residential environment 400, which the image recognition system 420 analyzes to identify various food items. Accordingly, the assistant device 110 may know that the patient 120 is eating via audio cues and know what the patient 120 is eating when supplemented by the camera sensor 430d and the image recognition system 420 so that the chart for the patient 120 is updated accordingly. Similarly, the camera sensor 430d may be invoked to track how much the patient 120 is eating by comparing subsequent images of the food images to identify uneaten portions of a meal, which can also be added to the medical record for the patient 120.

In another example, a pressure or weight sensor 330d may be used to judge when specific items are removed from a refrigerator 440c (and how much of those items are consumed if returned to a pressure or weight sensors 330d in the refrigerator 440c). Accordingly, the assistant device 110 may chart over time the patient's eating and drinking behaviors (e.g., where, where, how much, and what is consumed) to identify consumption patterns that are related to various health conditions over time. Patterns of eating, such as number of times the patient 120 eats per day, may be used to identify situations outside of normal and then alert the network 150, patient 120, and authorized persons 130 (e.g., skipping meals which may lead to weight loss and malnutrition).

In addition to tracked behaviors, the sensors may be used to identify emergency conditions, such as when a patient 120 leaves a stove 440a on after leaving the kitchen. For example, a presence sensor 330a or a camera sensor 430d may identify when the patient 120 leaves the kitchen, and a smoke detector 430a, an electric or gas meter 430b, or a thermometer or thermo-sensor 430c may be used to identify when the stove 440a is still active. The emergency condition, if detected, may be added to the patient's chart to indicate a likelihood of causing the emergency condition again in the future, but may be tracked differently than other behaviors. For example, a single instance of poor eating or overeating may be of little concern on its own, but a single instance of leaving the stove 440a on while unattended may be of immediate concern. Accordingly, the assistant device 110 may differentiate tracked behaviors that are charted and tracked over time to determine a health impact on a patient 120, versus emergency conditions that should receive immediate attention without trend analysis.

In various embodiments, the assistant device 110 may produce confirmation audio 320 to receive additional information from persons in the residential environment 400 or provide alerts to emergency conditions. For example, the assistant device 110 may produce confirmation audio 320 of "how was your lunch?" to prompt the patient 120 to provide additional information about the food that was eaten when eating behaviors have been detected (e.g., to determine whether the patient 120 enjoyed the meal, what the patient 120 ate, to confirm that the patient 120 was the person who ate the meal, etc.). In another example, the assistant device 110 may produce confirmation audio 320 of "is the range still on?" to prompt the patient 120 to turn off the range or indicate that the patient 120 has not forgotten about the range being on (e.g., when leaving the kitchen to take care of another task).

FIG. 4B illustrates a second scenario, in which the monitored portion of the residential environment 400 includes a bedroom or other sleeping area, according to embodiments of the present disclosure. As illustrated, a bedroom portion of the residential environment 400 may include a bed 440d (or another fixture 440, such as a reclining chair) related to tracked behaviors for sleep. The assistant device 110 may monitor the bedroom portion of the residential environment 400 for various environmental sounds 310 associated with sleep events, such as snoring (or the absence thereof), sleep disturbances (e.g., a person getting out of bed), or the like.

The assistant device 110 may be in communication with one or more of a presence sensor 330a, a pressure or weight sensor 330d, a light sensor 330e, and a camera sensor 430d (with associated image recognition system 420) to identify when the patient 120 enters and exits the bed 440d, whether the patient 120 is moving, whether the patient 120 has left the lights on, has their eyes open, or the like to track when and for how long the patient 120 is asleep. In various embodiments, the times and durations of sleep for the patient 120 are added to a chart for the patient 120 to track sleep behaviors, which can include whether the patient 120 snores or has other breathing difficulties, has fitful sleep (e.g., moves more than a threshold amount), or the like.

FIG. 4C illustrates a third scenario, in which the monitored portion of the residential environment 400 includes a doorway or other entry/exit area from to/from the residential environment 400, according to embodiments of the present disclosure. As illustrated, an entryway portion of the residential environment 400 may include a door 440e (or other entry fixture 440, such as revolving, roll-up, sliding, hinged, tilting doors, curtained entryways, and thresholds) related to tracked behaviors for entering and leaving the residential environment 400 or specific sections of the residential environment 400.

Monitoring entryway portions of the residential environment 400, either to areas outside of the residential environment 400 or between various subsections of the residential environment 400 allows the assistant device 110 to better track the activity level of the patient 120. For example, by knowing when the patient 120 has left the residential environment 400 (and for how long), the assistant device 110 may identify how active or sedentary a given patient 120 is in the chart.

Additionally or alternatively, by monitoring how long the patient 120 is outside of the observation area of the assistant device 110 and associated sensors, the assistant device 110 may identify mitigating circumstances for how to react to data collected within the observable environment. For example, when the assistant device 110 normally waits X minutes before generating an alert after the patient 120 leaves a kitchen with the stove on (e.g., to allow the patient 120 to retrieve a cookbook from another room, to quickly toilet, etc.), the assistant device 110 may instead automatically generate an alert in response to the patient using a door 440e to the outside of the residential environment 400 before the X minutes have expired. In another example, when the assistant device 110 tracks toileting behavior over a period of time (e.g., daily toileting), and the patient 120 is not within the environment for a given amount of time, the assistant device 110 may seek input from the patient 120 to provide toileting information for the time outside of the environment, or make various assumptions of the patient's toileting behavior to determine whether to address a health condition for the patient 120, as is described in greater detail in regard to method 600 of FIG. 6.

The assistant device 110 may monitor for environmental sounds 310 of a patient 120 using a door 440e or passing through the door 440e (e.g., sounds associated with opening or closing the door 440e), or footsteps passing through the entryway to identify activity patterns for the patient 120. Additionally or alternatively, the assistant device 110 may receive further input for the use of a door 440e from a camera sensor 430d (and associated image recognition system 420), a light sensor 430e, a pressure or weight sensor 330d, a presence sensor 330a, or an entry sensor 430f (e.g., indicating the door 440e has opened/closed, a person has passed through a light curtain, or the like).

Examples Methodologies

Figure 5:
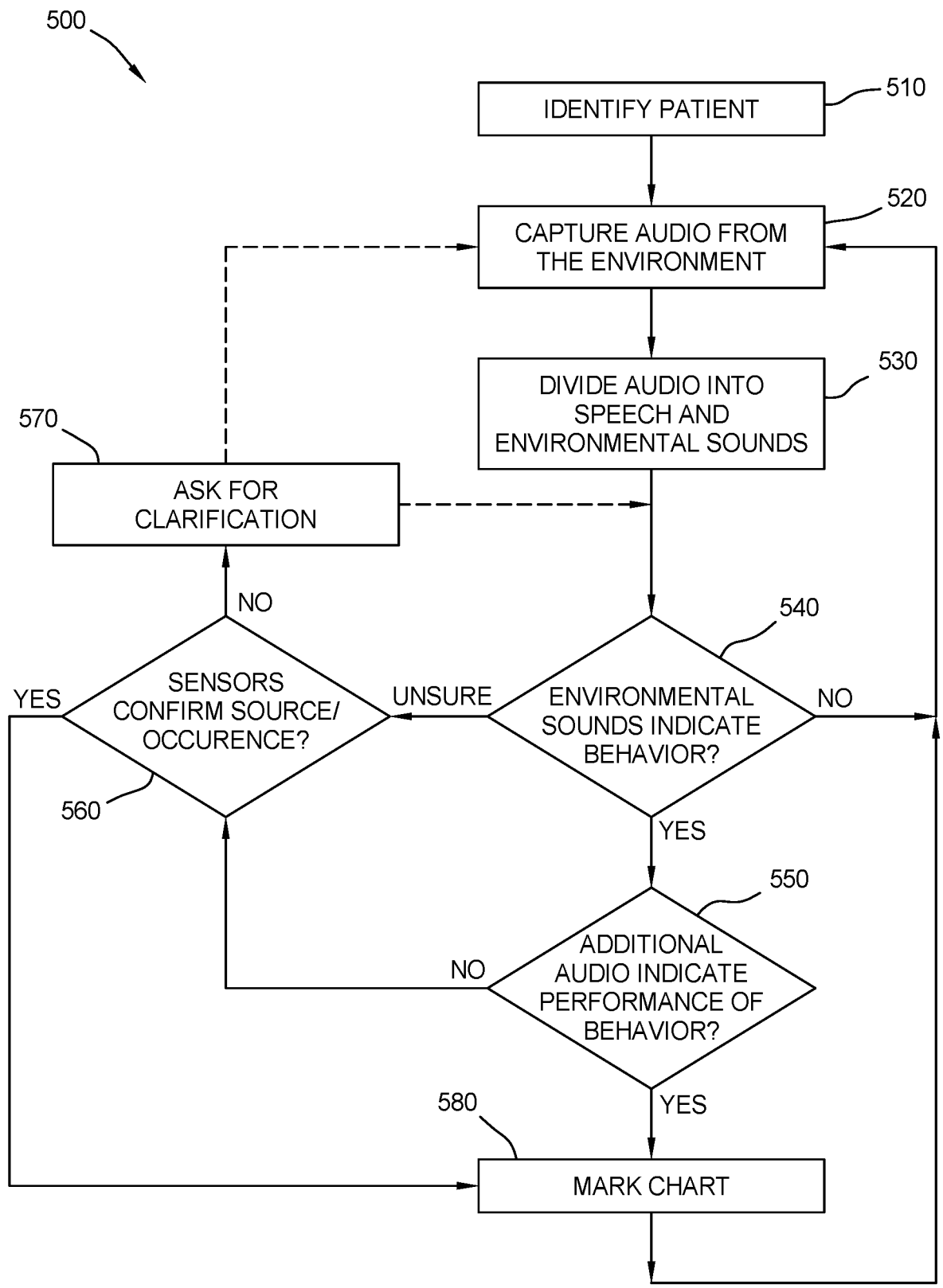
FIG. 5 is a flowchart for automated charting via an assistant device, according to embodiments of the present disclosure.

FIG. 5 is a flowchart of a method 500 for automated charting via an assistant device, according to embodiments of the present disclosure. Method 500 begins at block 510 where the assistant device identifies a patient whose behaviors are to be tracked and charted. Although generally given with examples related to toileting as the tracked behavior, method 500 may track a wide array of behaviors in various environments to chart for patients.

In various embodiments, the patient may be identified as any occupant of a room or living environment for whom activities are to be tracked. For example, in a hospital setting, when a new patient is admitted to a single-occupant room, any activity performed in the room may be associated with the patient unless otherwise disqualified. Accordingly, when tracking toileting, any use of bathroom facilities may be assigned to the patient without further identification of who performed the activity as the nurses and doctors are not expected to use the bathroom facilities in the environment. Other uses of the bathroom facilities (e.g., for cleaning, multiple flushes for one toileting event) may be disqualified from consideration by various analysis filters by the assistant device to avoid over charting behaviors for the patient (e.g., as per block 540).

In some embodiments, the patient may be identified as a specific person to whom activities are charted via a voice pattern, facial recognition, or audio confirmation after a tracked event for the behavior has been identified. For example, in a residential setting or a multi-occupant room in a hospital, the assistant device may need to distinguish the activities of a first person from that of a second person. Accordingly, when tracking toileting, uses of bathroom facilities may be assigned to the patient after determining who among several potential persons performed the activity. The assistant device may monitor the relative locations of persons to assign the activity to the correct person. For example, presence sensors or cameras may identify that a first person entered a bathroom or is absent from the non-bathroom portions of the environment while a second person is present in the non-bathroom portions of the environment to assign the event to the first person. Additionally or alternatively, the assistant device may request clarification via audio commands as to who used the bathroom facilities to identify which persons to associate the toileting event with. Other uses of the bathroom facilities (e.g., for cleaning, multiple flushes for one toileting event) may be disqualified from consideration by various analysis filters by the assistant device to avoid over charting behaviors for the patient (e.g., as per block 540).

At block 520, the assistant device captures audio from the environment. Additionally, any sensors in the environment provide associated outputs and analyses to the assistant device. For example, a presence sensor may indicate that a person has entered a given region of the environment, a pressure or weight sensor may indicate that a load has been applied or released from an associated object, a flow sensor may indicate water flow through a given fixture in the environment, a camera and associated facial recognition system may indicate that a given person is present in the environment, etc. In various embodiments, the assistant device may include directional microphones or be part of a constellation of assistant devices deployed within the environment and may analyze various audio captured in one region of the environment separately or in combination with audio captured in other regions of the environment.

At block 530, the assistant device divides the audio captured from the environment into speech sounds and environmental sounds. Although many personal AI assistants filter out or otherwise discard environmental sounds as undesirable noise when listening for speech sounds (e.g., to reduce the amount of data transmitted to remote processing services), by retaining the environmental sounds for further local analysis, and dividing the audio into environment sounds and speech sounds, the assistant devices of the present disclosure are provided with additional functionalities and improved data security for potentially health-related information. Accordingly, commercially available assistant devices may be used according to the present disclosure for speech recognition using remote computing resources without revealing environmentally determined behaviors to a third party, or otherwise sending unfiltered audio over a network connection. The environmental sounds that are normally filtered out are retained for analysis locally (per block 540) by the assistant device, while speech sounds are (optionally) transmitted to a remote computing resource with a speech recognition engine for natural language processing and intent recognition.

At block 540, the assistant device determines whether the environmental sounds indicate a tracked behavior has occurred in the environment. In various embodiments, the assistant device locally processes various environmental sounds against known sounds via an audio recognition engine to identify specific sounds from the environment. These sounds may be learned via a machine learning model using supervised training (or supervised feedback) specific to a given environment so that a first assistant device disposed in a first environment can learn the nuances of a given sound differently from a second assistant device disposed in a second environment. For example, different designs of toilets and surrounding environment, different locations and types of assistant devices, and what other sources of sounds in the specific environments may all alter what toileting sounds actually sound like (and the loudness thereof) in a given environment. Thus, during a calibration or initialization phase, the AI assistant device can detect environmental sounds and ask the patient (or other person in the vicinity) to label the sounds, e.g., "that was the toilet flushing" or "I was washing my hands", etc. This information can then serve as training data to perform supervised training for the machine learning model. Accordingly, an audio recognition model hosted by the assistant device may be trained to recognize the sound profiles for various activities within the corresponding environment.

When the captured environmental sounds match a sound associated with tracked behaviors (e.g., with a confidence above a presence confirmation threshold), method 500 proceeds to block 550. When the captured environmental sounds do not match any sounds associated with tracked behaviors (e.g., with a confidence below an absence confirmation threshold), method 500 returns to block 520 to continue capturing audio from the environment. When the assistant device is unsure whether the captured environmental sounds match any sounds associated with tracked behaviors (e.g., with a confidence within an uncertainty window between an absence confirmation threshold and a presence confirmation threshold) or when the captured environmental sounds can match to multiple tracked behaviors (e.g., matching two or more sounds above the presence confirmation threshold), method 500 proceeds to block 560.

At block 550, the assistant device determines whether the additional audio confirms performance of the behavior. In various embodiments, the assistant device determines performance of the behavior by determining which person made the associated environmental sounds, which may be based on vocal patterns of the persons in the environment, or a person identifying themselves as the source in response to a request for clarification from the assistant device (e.g., per block 570). In some embodiments, the assistant device analyzes the additional audio to identify whether the environmental sound is part of a series of sounds indicative of the behaviors (e.g., sounds associated with urination/defecation followed by sounds associated with flushing and running water or handwashing sounds being indicative of toileting behavior). In some embodiments, the assistant device analyzes the additional audio to identify whether the environmental sound is part of a series of sounds counter-indicative of the behaviors (e.g., scrubbing sounds and multiple flushing sounds received within a threshold amount of time being associated with cleaning behavior rather than a toileting behavior).

In some embodiments, the additional audio can include speech sounds, which can differentiate whether the patient or a different person toileted based on the speech sounds indicating which person is outside of a region of the environment associated with the behavior, requesting conformation from at least one person for who performed the behavior, or the like.

When the assistant device determines that the additional audio indicate performance of the behavior by a monitored patient, method 500 proceeds to block 580. Otherwise, method 500 proceeds to block 560.

At block 560, the assistant device determines whether the additional sensors confirm a source or occurrence of the behavior (e.g., a candidate event). For example, the assistant device may communicate with various presence sensors, motion sensors, cameras (with or without facial recognition) or the like to identify that a person (or a specific person) is inside or outside of a region of the environment associated with the tracked behavior. Additionally or alternatively, flow sensors, pressure or weight sensors, thermometers, humidity sensors, and the like can be used to identify when a person has interacted with another device or appliance associated with a tracked behavior. In various embodiments, these additional sensors may be invoked if the audio cannot confirm the occurrence or performer of a given behavior, thus providing a greater level of privacy for the patent regarding the tracked behaviors, and reducing the amount of computing resources and data transmission needed to track behaviors in the embodiment relative to systems that constantly rely on the additional non-audio sensors.

For example, in a toilet tracking scenario, the assistant device may rely on one or more supplemental sensors to confirm that a toileting event has occurred (e.g., confirm the candidate event), which can include one or more of a presence sensor (e.g., for determining that the patient is present in a bathroom or within a proximity of a toilet or sink), a pressure sensor (e.g., for determining that the patient is present on a toilet seat or a mat near a toilet or sink), and a water flow meter (e.g., for determining which water fixtures have been used).

When the assistant device determines that the additional sensors confirm the previously unknown source of the behavior or that the detected events are indicative of the tracked behavior actually being performed (rather than a similar-sounding behavior), method 500 proceeds to block 580. Otherwise, method 500 proceeds to block 570.

At block 570, the assistant device asks for clarification via an audio output to the environment or a message to a personal device for the patient. For example, when the assistant device is unsure whether the patient or another person toileted or that toileting even occurred, the assistant device may generate an audio output asking, via synthesized human language, who (if anyone) performed the behavior that the assistant device suspects occurred. In another example, the assistant device may send a request to a personal device to confirm (not using audio inputs) whether the patient performed the suspected behavior.

Additionally or alternatively, the assistant device may use various sensors or request a reply to a qualitative query posed to personal device to provide additional details related to the behavior. For example, when the tracked behavior relates to toileting, the type of toileting event and various qualitative measures related to toileting may be unknowable based solely on audio inputs. Accordingly, the assistant device may activate a camera to capture an image any waste in a toilet after the patient is no longer present on the toilet (e.g., to preserve privacy and gain a better image) or request a patient to supply various details related to the waste via a qualitative query. Such details may include: a consistency of any fecal matter included in the waste; whether the waste includes blood; a color of the waste; a quantity or composition of the waste, a type of the toileting event (e.g., urination alone, urination and defecation, defecation alone, vomiting, and non-digestive use such as cleaning). In another example, the assistant device may interface with a personal device for the patient to prompt the patient to take a picture or select a "best match" for the waste in the toilet out of a plurality of potential waste images.

When additional clarification is received that indicates either further details related to the tracked behavior or the source of the behavior, method 500 may return to block 540 for the assistant device to further analyze whether the initially suspected behavior occurred. Otherwise, when no confirmation is received in response to the request, method 500 may return to block 520 to continue monitoring for future events.

At block 580, the assistant device marks the chart to indicate the determined behavior based on the source of the behavior. For example, when a toileting behavior has been detected and identified as being associated with the patient (rather than a non-monitored person), the assistant device adds the toileting event to a chart associated with the patient along with any qualitative details associated with the toileting event. Method 500 may then return to block 520 to continue monitoring for future events.

Figure 6:
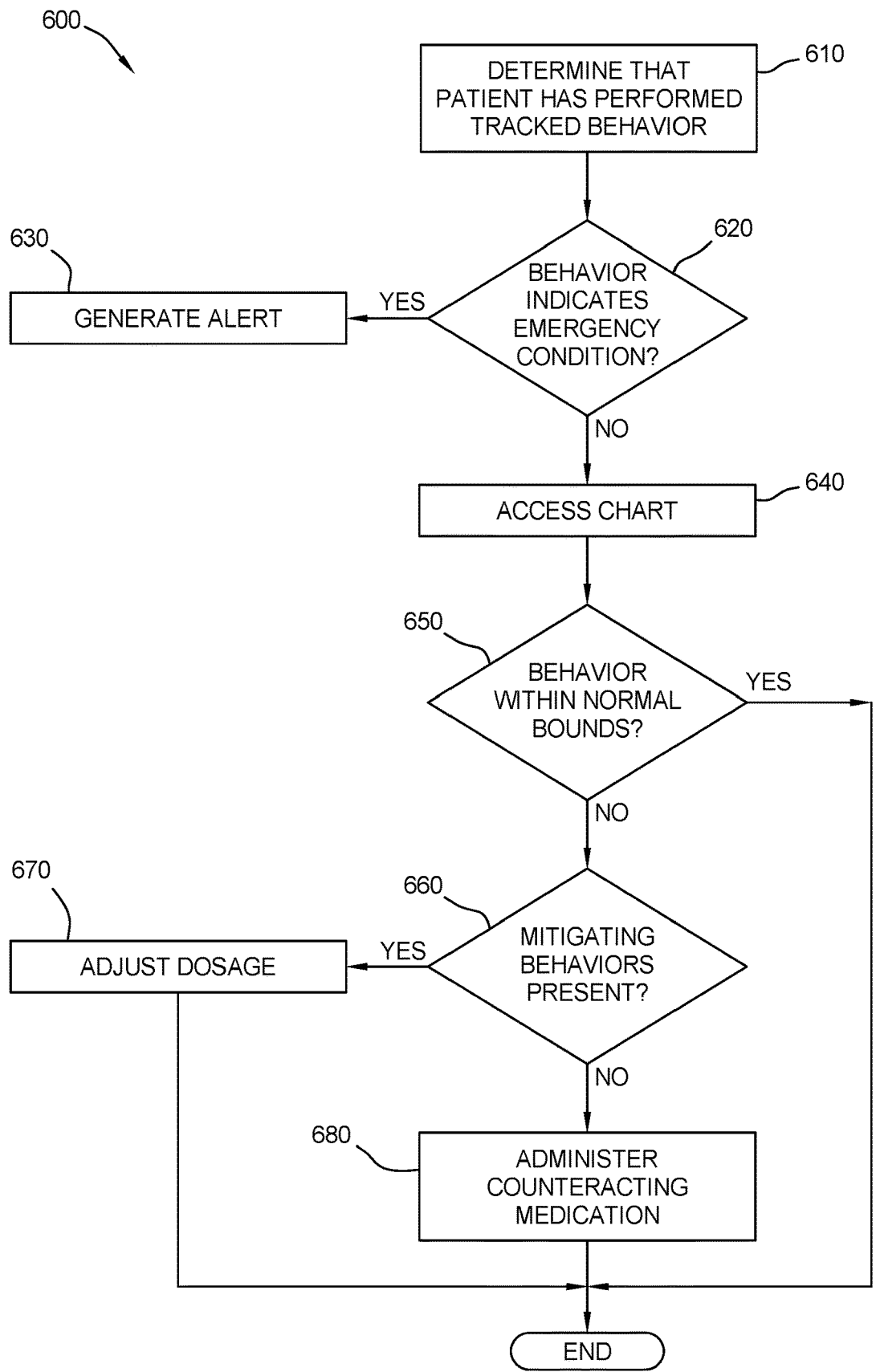
FIG. 6 is a flowchart of a method for the treatment or prophylaxis of a monitored condition via an assistant device, according to embodiments of the present disclosure.

FIG. 6 is a flowchart of a method 600 for the treatment or prophylaxis of a monitored condition via an assistant device, according to embodiments of the present disclosure. Method 600 begins at block 610, where the assistant device determines that the patient has performed a tracked behavior. In various embodiments, the tracked behavior can include one or more of: sleeping, consuming food or drink, performing out-of-environment activities, or toileting. In various embodiments, the assistant device determines whether the patient performed the tracked behavior according to method 500 discussed in relation to FIG. 5.

For example, when the tracked behaviors include sleep, sleeping is tracked based on start time, end time, duration, motion of the patient, snoring, location in the environment of sleep, and a number of sleep disturbances. In another example, when the tracked behaviors include food or drink consumption, consumption is tracked based on frequency of consumption, whether consumption includes drinking or eating, types of items consumed, and quantity consumed. In another example, when the tracked behaviors include out-of-environment activity, out-of-environment activity is tracked based on times of exiting and returning to the environment. In another example, when the tracked behaviors include toileting, toileting is tracked based on a frequency of toileting, a volume of toileting, a consistency of any fecal matter included in waste, and a color of the waste. Some or all of these data may be stored locally (e.g., as a daily cache) on the assistant device, with the remainder being stored in a chart repository maintained remotely from the assistant device.

At block 620, the assistant device determines whether the behavior indicates an emergency condition. As used herein, an emergency condition refers to a condition that deserves immediate (or as soon as possible) attention from a medical provider or correction in the environment to avoid harm to the patient, and that otherwise does not require trend analysis to determine if the patient is in distress.

For example, vomiting may be a medical condition marked as an emergency condition, as one incidence of vomiting is sufficient to deserve the attention of a medical provider. In contrast, a bowel movement (on its own) does not generally indicate a condition worthy of attention from a medical provider, whereas frequent bowel movements in a given time period are indicative of diarrhea, which is a condition worthy of attention from a medical provider. In another example, leaving the stove on and leaving the kitchen may be an environmental condition marked as an emergency condition, as some patients may be at risk of forgetting that the stove is on and potentially starting a fire.

In various embodiments, the condition may be set based on an assessment of the patient's memory, patient's medical condition, patient's characteristics (weight or age) likelihood of falling asleep, location in the environment (e.g., leaving the kitchen to stay in an adjoining room versus leaving the living quarters), and time outside of the kitchen (e.g., triggered after X minutes away). Accordingly, a medical provider may set various definitions to qualify emergency condition from non-emergency conditions and when a series or trend of non-emergency conditions become worthy of attention. When a latest observed (single) instance of a behavior indicates an emergency condition, method 600 proceeds to block 630. Otherwise, when the latest observed instance does not indicate an emergency condition, method 600 proceeds to block 640.

At block 630, the assistant device generates an alert. In various embodiments, the alert may be conveyed to the environment by the assistant device via an audio output (e.g., "please check the stove. You have left it on"). Additionally or alternatively, the assistant device may generate an alert message that is transmitted to a caretaker outside of the environment (e.g., to a personal device via in-application messages, text messages, or a phone call using a simulated audio output). The alert, in addition to the behavior, may also be added to an electronic chart for the patient to indicate that the emergency condition has been recorded and that the assistant device recommended a treating professional (or the patient) to take action to treat the patient or take action to avoid harm to the patient.

In some embodiments, the alert includes an interface command with one or more appliances or controllable electronics in the environment. For example, in additional to charting the alert, and generating an audio output to alert the patient to turn off an unattended stove, the assistant device may send a command to cut off an electricity or gas supply to the stove.

At block 640, the assistant device accesses the electronic chart for the patient. In various embodiments, the assistant device establishes a secure connection with a charting repository located remotely from the assistant device and adds the event and associated data to an electronic chart associated with the patient that is maintained by the charting repository.

At block 650, the assistant device determines whether the behavior is within normal bounds for the patient. When analyzing patient behavior over a given time period (e.g., for daily toileting analysis, monthly sleep pattern analysis, etc.), the assistant device may locally cache a rolling window of data to examine for trends in the behavior. The remote chart repository, or a demographic definition, may supply a baseline to judge the patient behavior by. For example, the assistant device may store the toileting behavior of the last twenty-four hours for a patient, which is compared against the normal or baseline behavior of an average person of the same age, gender, size, medical history, etc., as the patient to determine when the patient's toileting behavior is too frequent or not frequent enough. In another example, the assistant device may compare the recent toileting behavior for a patient to a baseline for the patient which can be generated from eating habits, medical conditions, past incidents, family member concerns, etc. Accordingly, the assistant device may locally store various healthy upper limits and healthy lower limits for the patient based on the patient's personal history or the history of demographically similar patients.

Because the assistant device can monitor the patient in the environment, but the patient can be free to leave the environment and engage in monitored activities outside of the observable environment, the assistant device may extrapolate the behavior of the patient while outside of the environment when determining whether the behavior is within normal bounds. For example, when the assistant device has identified that the patient is within healthy limits for toileting in a given day (e.g., only X−1 of the specified upper healthy limit of X toileting events in a day), but the assistant device has also identified that the patient has been out of the environment (e.g., visiting friends, shopping, going to doctor appointments, or is otherwise "out") for at least Y hours since the last observed toileting, during which time at least two extrapolated toileting events are expected to occur, the assistant device may conditionally conclude that toileting is above the upper healthy limit (e.g., $(X-1)_{observed} + 2_{extrapolated} > X$). However, because toileting only potentially occurred outside of the monitored environment, and patient self-reporting is notoriously unreliable, the assistant device may determine (per block 660) whether any mitigating events can partially resolve the tracked and extrapolated behaviors falling outside of the healthy bounds for the patient.

When the tracked behavior is (currently) within healthy bounds for the patient, method 600 may conclude and repeat the next time an event related to a tracked behavior is detected. Otherwise, method 600 proceeds to block 660 when the tracked behavior is outside of the healthy bounds for the patient.

At block 660, the assistant device determines whether any mitigating behaviors are present to explain or otherwise lower confidence in the determination in block 650 that the tracked behavior is outside of the healthy bounds for the patient.

For example, when the assistant device has identified that the patient has fallen below a lower healthy limit for toileting in a given day (e.g., only X−1 of the specified lower healthy limit of X toileting events in a day), but the assistant device has also identified that the patient has been out of the environment (e.g., visiting friends, shopping, going to doctor appointments, or is otherwise "out") for at least Y hours since the last observed toileting, the assistant device may conclude that toileting potentially occurred outside of the monitored environment. However, because toileting only potentially occurred outside of the monitored environment, and patient self-reporting is notoriously unreliable, the mitigating event may not fully resolve the tracked behavior falling outside of the healthy bounds for the patient.

In another example, when the assistant device has identified that the patient has exceeded an upper healthy limit for toileting in a given day, the assistant device may analyze whether the determination was made based on extrapolation of activities presumed to occur outside of the environment, or activities directly observed within the environment. The assistant device may also consult the electronic chart and/or locally cached behaviors observed for the patient to determine whether the patient has consumed a greater than normal amount of liquids or food for the given time period, or has had multiple "small" or low-volume toileting events that if aggregated count may bring the toileting volume back into healthy bounds.

Medical professionals and others of ordinary skill in the relevant fields of art may define various mitigating factors based on cross-related activities (e.g., more fluid intake leads to increased urination ceteris paribus), medication indications or side effects (e.g., patient is taking medication A, which reduces frequency of bowel movements), and levels of extrapolation that the assistant device may make when examining user behaviors. Accordingly, by tracking the patient's behavior in the environment, and related behaviors in the environment (including behaviors to exit and re-enter the environment), the assistant device can identify behaviors that while initially deemed to be within or outside of the healthy bounds for the patient, may in fact, be the opposite.

When the assistant device has identified that the determination of the patient's behavior as being within normal bounds is affected by a mitigating behavior, method 600 proceeds to block 670. Otherwise, method 600 proceeds to block 680.

At block 670, the assistant device adjusts a dosage of a counteracting medication for the behavior. Because the mitigating behavior identified (per block 660) raises questions regarding the accuracy of the collected data on the patient's behavior, but does not resolve the underlying identification of the behavior being outside of healthy bounds, the patient will still be administered a counteracting medication (per block 680), but the dosage of that medication may be adjusted to avoid over medicating the patient for the undesired behavior.

For example, in response to toileting activity for the patient falling below a healthy lower limit for a given time period, and after determining that the patient has been outside of the environment for at least a threshold amount of time (and potentially toileted outside of the environment), the assistant device may lower the dosage of any laxatives or diuretics to be administered to the patient below a normal dose for the patient. The normal dose may be a therapeutically effective dose for a person of the same demographic conditions as the patient (e.g., age, weight, gender, etc.) or a currently prescribed dose for the individual patient (e.g., X milligrams (mg) of medication Y for patient A and Z mg of medication Y for patient 8).

In another example, in response to toileting activity for the patient exceeding a healthy upper limit for a given time period, and after determining that the patient has engaged in abnormally high fluid or food consumption during the given time period, the assistant device may lower the dosage of any anti-diarrheal or anti-diuretic to be administered to the patient below a normal dose for the patient. The normal dose may be a therapeutically effective dose for a person of the same demographic conditions as the patient (e.g., age, weight, gender, etc.) or a currently prescribed dose for the individual patient (e.g., X mg of medication Y for patient A and Z mg of medication Y for patient 8).

Yet another example involves patient pain. Excessive time spent in bed may be a result of increased pain, the assistant device may track the predicted or inferred pain level, report to the network 150 and authorized individuals 130, and increase or suggest a pain medication be administered. Excessive time in bed may also be a result of increased depression which can also be reported and used to adjust a medication for the patient.

At block 680, a counteracting medication is administered to the patient according to a recommended dosage. For example, when the patient is observed to have toileting behavior of excessive urination, a diuretic is administered to the patient. Other medications may include anti-diuretics (for lack of urination), laxatives (for lack of bowel movements), anti-diarrheal (for excessive bowel movements), sedatives (for lack of sleep), stimulants (for excessive sleep or anhedonia), anti-depressants (for lack of activity or anhedonia), appetite or thirst stimulants (for lack of eating/drinking), appetite or thirst depressants (for excessive eating/drinking), etc. Additionally or alternatively, a treating professional may adjust currently prescribed medications with various side effects to lessen or increase the effect of those side effects to address the observed behaviors. One of ordinary skill in the art will appreciate that various medications interact with one another, and will be able to select an appropriate medication as a counteracting medication for the observed behavior. Method 600 may then conclude.

Example Computing Hardware

Figure 7:
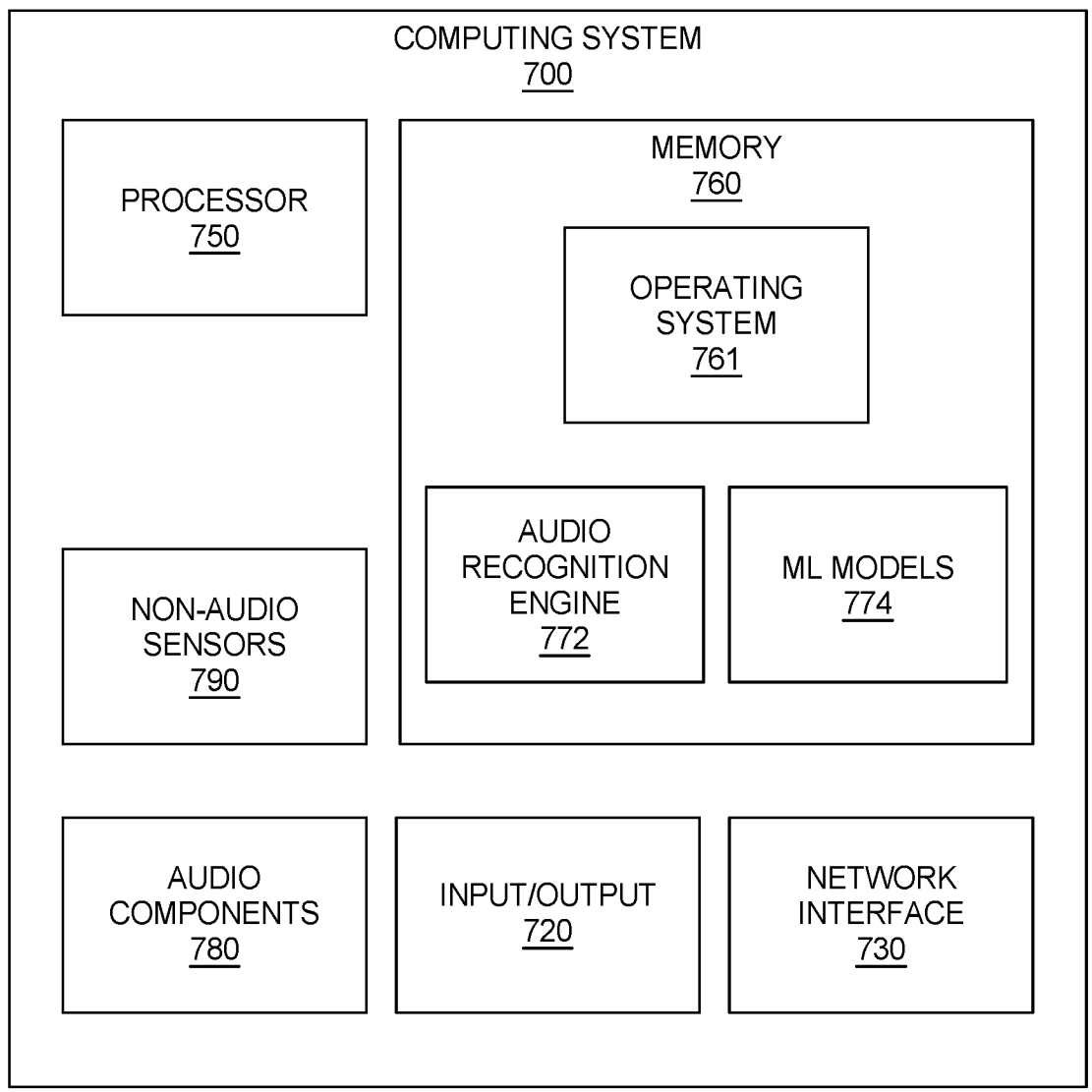
FIG. 7 illustrates a computer device, according to embodiments of the present disclosure.

FIG. 7 illustrates a computing system 700, which may be an assistant device 110, a personal device 350 (e.g., a computer, a laptop, a tablet, a smartphone, etc.), or any other computing device described in the present disclosure. As shown, the computing system 700 includes, without limitation, a processor 750 (e.g., a central processing unit), a network interface 730, and memory 760. The computing system 700 may also include an I/O device interface connecting I/O devices 720 (e.g., keyboard, display and mouse devices) to the computing system 700.

The processor 750 retrieves and executes programming instructions stored in the memory 760. Similarly, the processor 750 stores and retrieves application data residing in the memory 760. An interconnect facilitates transmission, such as of programming instructions and application data, between the processor 750, I/O device interface, storage, network interface 730, and memory 760. The processor 750 is included to be representative of a single processor, multiple processors, a single processor having multiple processing cores, and the like. And the memory 760 is generally included to be representative of volatile and non-volatile memory elements. For example, the memory 760 can include random access memory and a disk drive storage device. Although shown as a single unit, the memory 760 may be a combination of fixed and/or removable storage devices, such as magnetic disk drives, flash drives, removable memory cards or optical storage, network attached storage (NAS), or a storage area-network (SAN). The storage may include both local storage devices and remote storage devices accessible via the network interface 730. One or more machine learning (ML) models 774 are maintained in the memory 760 to provide localized portion of an AI assistant via the computing system 700. Additionally, one or more AR engines 772 may be maintained in the storage to match identified audio to known events occurring in an environment where the computing system 700 is located.

Further, the computing system 700 is included to be representative of a physical computing system as well as virtual machine instances hosted on a set of underlying physical computing systems. Further still, although shown as a single computing device, one of ordinary skill in the art will recognize that the components of the computing system 700 shown in FIG. 7 may be distributed across multiple computing systems connected by a data communications network.

As shown, the memory 760 includes an operating system 761. The operating system 761 may facilitate receiving input from and providing output to various audio components 780 and non-audio sensors 790. In various embodiments, the audio components 780 include one or more microphones (including directional microphone arrays) to monitor the environment for various audio including human speech and non-speech sounds, and one or more speakers to provide simulated human speech to interact with persons in the environment. The non-audio sensors 790 may include sensors operated by one or more different computing systems 700, such as, for example, presence sensors, motion sensors, cameras, pressure or weight sensors, light sensors, humidity sensors, temperature sensors, and the like, which may be provided as separate devices in communication with an assistant device 110, or a managed constellation of sensors (e.g., as part of a home security system in communication with an assistant device 110). Although illustrated as external to the computing system 700, and connected via the I/O interface, in various embodiments, some or all of the audio components 780 and non-audio sensors 790 may be connected to the computing system 700 via the network interface 730, or incorporated in the computing system 700 and directly connected to the interconnect 740. The network interface 730 can be used to establish the secure connection with a charting repository located remotely from the computing system 700 (e.g., the AI assistant device). The network interface 730 can then be used to add event to a health chart associated with a patient maintained by the charting repository by transmitting information regarding the event to the charting repository.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

Clause 1: A method comprising: capturing, via an Artificial Intelligence (AI) assistant device, audio from an environment; determining, via a machine learning model provided by the AI assistant device and based on the audio, that a patient has performed an event in the environment related to the health of the patient; establishing a secure connection with a charting repository located remotely from the AI assistant device; and adding the event to a health chart associated with a patient maintained by the charting repository.

Clause 2: In addition to the clause 1, wherein the audio includes environmental sounds filtered out from speech sounds captured by the AI assistant device for speech recognition in the environment, wherein the event is identified via the environmental sounds and not the speech sounds.

Clause 3: In addition to the clause 2, the method further comprising: identifying persons in the environment, wherein the persons include the patient and a different person; and wherein determining, based on the audio, that the event has occurred in the environment further comprises differentiating whether the patient or the different person toileted based on the speech sounds.

Clause 4: In addition to the clauses 2 or 3, the method further comprising: in response to the environmental sounds indicating a candidate event that falls within an uncertainty window, querying additional sensors for data to augment a determination of whether the event has occurred.

Clause 5: In addition to the clauses 1, 2, 3, or 4, wherein the audio includes a sound sequence including sounds matching at least two of: waste entry to a toilet; a flushing, after a waste entry sound is detected; and running water, after at least one of the waste entry sound or a flushing sound is detected.

Clause 6: In addition to the clauses 1, 2, 3, 4, or 5, the method further comprising: in response to detecting waste entry to a toilet and release from a pressure sensor, activating a camera to capture an image of waste; analyzing the image of the waste in the toilet to identify: a consistency of any fecal matter included in the waste; whether the waste includes blood; a color of the waste; and a quantity of the waste.

Clause 7: In addition to the clauses 1, 2, 3, 4, 5, or 6, wherein determining that the event has occurred in the environment further comprises at least one of: determining that the patient is present in a bathroom based on a presence sensor; determining that the patient is present on a toilet based on a pressure sensor included in the toilet; and determining that the toilet has been flushed based on a water flow meter included in the toilet.

Clause 8: In addition to the clauses 1, 2, 3, 4, 5, 6, or 7, the method further comprising, after determining that the event has occurred in the environment: sending a qualitative query to a personal device associated with the patient; and receiving, at the AI assistant device from the personal device, a qualitative reply indicating: a color and composition of waste present in the event; and a type of the event selected as one of: urination alone, urination and defecation, defecation alone, vomiting, and non-digestive use.

Clause 9: In addition to the clauses 1, 2, 3, 4, 5, 6, 7, or 8, the method further comprising, in response to toileting activity for the patient exceeding a healthy upper limit for a given time period and determining that the patient has engaged in abnormally high fluid or food consumption during the given time period based on environmental sounds: administering a one of an anti-diarrheal or an anti-diuretic at a lower than normal dose to the patient.

Clause 10: In addition to the clauses 1, 2, 3, 4, 5, 6, 7, 8, or 9, the method further comprising in response to toileting activity for the patient falling below a healthy lower limit for a given time period, and in response to determining that the patient has been outside of the environment for at least a threshold amount of time based on entryway monitoring: administering a one of a laxative or a diuretic at a lower than normal dose to the patient Clause 11: A method comprising: identifying a patient and a behavior related to a health condition for the patient that is tracked in an electronic health chart; capturing, via an Artificial Intelligence (AI) assistant device, audio from an environment; capturing, via a sensor separate from the AI assistant device, a reading from the environment; determining, via a machine learning model provided by the AI assistant device and based on the audio and the reading, that an event associated with the behavior has occurred in the environment; establishing a secure connection with a charting repository located remotely from the AI assistant device; and adding the event to the electronic health chart associated with the patient maintained by the charting repository.

Clause 12: In addition to the clause 11, the method further comprising, as part of determining that the event associated with the behavior has occurred in the environment: generating a confirmation output to prompt the patient to provide an utterance related to the behavior; and analyzing the utterance, via an audio recognition engine, to determine whether the patient completed the behavior.

Clause 13: In addition to the clauses 11 or 12, wherein the behavior is sleep, wherein sleep is tracked based on start time, end time, duration, motion of the patient, snoring, location in the environment of sleep, and a number of sleep disturbances, wherein the sensor includes a motion sensor and a light sensor included in a sleeping area of the environment.

Clause 14: In addition to the clauses 11, 12, or 13, wherein the behavior is consumption, wherein consumption is tracked based on frequency of consumption, whether consumption includes drinking or eating, types of items consumed, and quantity consumed, wherein the sensor includes a weight or pressure sensor included in a food preparation area of the environment.

Clause 15: In addition to the clauses 11, 12, 13 or 14, wherein the behavior is out-of-environment activity, wherein out-of-environment activity is tracked based on times of exiting and returning to the environment, where the sensor includes an entry sensor at a doorway to the environment.

Clause 16: In addition to the clauses 11, 12, 13, 14 or 15, wherein the behavior is toileting, wherein toileting is tracked based on a frequency of toileting, a volume of toileting, a consistency of any fecal matter included in waste, and a color of the waste, wherein the sensor includes a pressure sensor included in a seat of a toilet.

Clause 17: A method comprising: capturing, via an Artificial Intelligence (AI) assistant device, audio from an environment; dividing, via a machine learning model provided by the AI assistant device, the audio into environmental sounds and speech sounds; analyzing the environmental sounds by the machine learning model to determine whether a person has performed a behavior associated with a health condition tracked in a health chart for a patient; analyzing the speech sounds by the machine learning model to determine whether the patient or a different person performed the behavior; and in response to determining that the patient performed the behavior: establishing a secure connection with a charting repository located remotely from the AI assistant device; and indicating in the health chart associated with the patient maintained by the charting repository that the patient performed the behavior.

Clause 18: In addition to the clause 17, wherein the behavior is toileting and in response to toileting activity for the patient falling below a healthy lower limit for a given time period, determining whether the patient has been outside of the environment for at least a threshold amount of time; and in response to the patient having been outside of the environment for at least the threshold amount of time, administering a one of a laxative or a diuretic at a lower than normal dose to the patient.

Clause 19: In addition to the clauses 17 or 18, wherein the behavior is toileting and in response to toileting activity for the patient falling below a healthy lower limit for a given time period, determining whether the patient has been outside of the environment for at least a threshold amount of time; and in response to the patient not having been outside of the environment for at least the threshold amount of time, administering a one of a laxative or a diuretic at a normal dose to the patient.

Clause 20: In addition to the clauses 17, 18, or 19, wherein the behavior is toileting and in response to toileting activity for the patient exceeding a healthy upper limit for a given time period, determining whether the patient has engaged in abnormally high fluid or food consumption during the given time period; and in response to the patient has engaged in abnormally high fluid or food consumption during the given time period, administering a one of an anti-diarrheal or an anti-diuretic at a lower than normal dose to the patient.

What is claimed is:

1. A method, comprising:
capturing, via an Artificial Intelligence (AI) assistant device, audio from an environment;
determining, via a machine learning model provided by the AI assistant device and based on the audio, that a patient has performed an event in the environment related to a health of the patient, wherein the audio includes a plurality of environmental sounds filtered out from a plurality of speech sounds captured by the AI assistant device for speech recognition in the environment, wherein the event is identified via the plurality of environmental sounds;
identifying a plurality of persons in the environment, wherein the plurality of persons include the patient and a different person; and
wherein determining, based on the audio, that the event has occurred in the environment further comprises differentiating whether the patient or the different person toileted based on the speech sounds;
in response to the environmental sounds indicating a candidate event that occurs within an uncertainty window, querying additional sensors for data to augment a determination of whether the event has occurred;
establishing a secure connection with a charting repository located remotely from the AI assistant device; and
adding the event to a health chart associated with the patient maintained by the charting repository.

2. The method of claim 1, wherein the audio includes a sound sequence including sounds matching at least two of:
waste entering a toilet;
a flushing sound, after waste entering the toilet is detected; and
running water, after at least one of waste entering the toilet or the flushing sound is detected.

3. The method of claim 1, wherein determining that the event has occurred in the environment further comprises at least one of:
determining that the patient is present in a bathroom based on a presence sensor;
determining that the patient is present on a toilet based on a pressure sensor included in the toilet; and
determining that the toilet has been flushed based on a water flow meter included in the toilet.

4. The method of claim 1, further comprising, after determining that the event has occurred in the environment:
sending a qualitative query to a personal device associated with the patient; and
receiving, at the AI assistant device from the personal device, a qualitative reply indicating:
a color and composition of waste present in the event; and
a type of the event selected as one of: a urination only event, a urination and defecation event, a defecation only event, a vomiting event, and a non-digestive use event.

5. The method of claim 1, further comprising, in response to toileting activity for the patient exceeding a healthy upper limit for a given time period and determining that the patient has engaged in abnormally high fluid or food consumption during the given time period based on environmental sounds:
administering at least one of an anti-diarrheal or an anti-diuretic at a lower than normal dose to the patient.

6. The method of claim 1, further comprising, in response to toileting activity for the patient falling below a healthy lower limit for a given time period, and in response to determining that the patient has been outside of the environment for at least a threshold amount of time based on entryway monitoring:
administering at least one of a laxative or a diuretic at a lower than normal dose to the patient.

7. A method, comprising:
capturing, via an Artificial Intelligence (AI) assistant device, audio from an environment;
in response to detecting waste entering a toilet and release from a pressure sensor, activating a camera to capture an image of the waste;
analyzing the image of the waste in the toilet to identify:
a consistency of any fecal matter included in the waste;
whether the waste includes blood;
a color of the waste; and
a quantity of the waste;
determining, via a machine learning model provided by the AI assistant device and based on the audio, that a patient has performed an event in the environment related to a health of the patient;
establishing a secure connection with a charting repository located remotely from the AI assistant device; and
adding the event to a health chart associated with the patient maintained by the charting repository.

8. The method of claim 7, further comprising, as part of determining that the event has occurred in the environment:
generating a confirmation output to prompt the patient to provide an utterance related to the event; and
analyzing the utterance, via an audio recognition engine, to determine whether the patient completed the event.

9. The method of claim 7, wherein a second event detected by the AI assistant device is sleep, wherein sleep is tracked based on start time, end time, duration, motion of the patient, snoring, location in the environment of sleep, and a number of sleep disturbances, wherein a motion sensor and a light sensor are included in a sleeping area of the environment.

10. The method of claim 7, wherein a second event detected by the AI assistant device is consumption, wherein consumption is tracked based on (i) frequency of consumption, (ii) whether consumption includes drinking or eating, (iii) types of items consumed, and (iv) quantity consumed, wherein a weight or pressure sensor is included in a food preparation area of the environment.

11. The method of claim 7, wherein a second event detected by the AI assistant device is out-of-environment activity, wherein the out-of-environment activity is tracked based on times of exiting and returning to the environment, where an entry sensor is disposed at a doorway to the environment.

12. The method of claim 7, wherein the event is toileting, wherein toileting is tracked based on a frequency of toileting, a volume of toileting, a consistency of any fecal matter included in waste, and the color of the waste, wherein the pressure sensor is included in a seat of the toilet.

13. A method, comprising:
   capturing, via an Artificial Intelligence (AI) assistant device, audio from an environment;
   dividing, via a machine learning model provided by the AI assistant device, the audio into environmental sounds and speech sounds;
   analyzing the environmental sounds by the machine learning model to determine whether a person has performed a behavior associated with a health condition tracked in a health chart for a patient, wherein the behavior includes toileting;
   identifying a plurality of persons in the environment, wherein the plurality of persons include the patient and a different person; and
   analyzing the speech sounds by the machine learning model to determine whether the patient or a different person toileted based on the speech sounds; and
   in response to the environmental sounds indicating a candidate toileting event that occurs within an uncertainty window, querying additional sensors for data to augment a determination of whether the candidate toileting event has occurred;
   in response to determining that the patient toileted:
      establishing a secure connection with a charting repository located remotely from the AI assistant device; and
      indicating in the health chart associated with the patient maintained by the charting repository that the patient toileted.

14. The method of claim 13, in response to toileting activity for the patient falling below a healthy lower limit for a given time period, determining whether the patient has been outside of the environment for at least a threshold amount of time; and
   in response to the patient having been outside of the environment for at least the threshold amount of time, administering at least one of a laxative or a diuretic at a lower than normal dose to the patient.

15. The method of claim 13, in response to toileting activity for the patient falling below a healthy lower limit for a given time period, determining whether the patient has been outside of the environment for at least a threshold amount of time; and
   in response to the patient not having been outside of the environment for at least the threshold amount of time, administering at least one of a laxative or a diuretic at a normal dose to the patient.

16. The method of claim 13, in response to toileting activity for the patient exceeding a healthy upper limit for a given time period, determining whether the patient has engaged in abnormally high fluid or food consumption during the given time period; and
   in response to the patient has engaged in abnormally high fluid or food consumption during the given time period, administering at least one of an anti-diarrheal or an anti-diuretic at a lower than normal dose to the patient.

17. An Artificial Intelligence (AI) assistant device, comprising:
   a microphone configured to capture audio from an environment; and
   a machine learning model;
   wherein the AI assistant device is configured to:
      determine, via the machine learning model and based on the audio, that a patient has performed an event in the environment related to a health of the patient, wherein the audio includes a plurality of environmental sounds filtered out from a plurality of speech sounds captured by the AI assistant device for speech recognition in the environment, wherein the event is identified via the plurality of environmental sounds;
      identify a plurality of persons in the environment, wherein the plurality of persons include the patient and a different person; and
      wherein determining, based on the audio, that the event has occurred in the environment further comprises differentiating whether the patient or the different person toileted based on the speech sounds;
      in response to the environmental sounds indicating a candidate event that occurs within an uncertainty window, query additional sensors for data to augment a determination of whether the event has occurred;
      establish a secure connection with a charting repository located remotely from the AI assistant device; and
      add the event to a health chart associated with a patient maintained by the charting repository.

* * * * *